United States Patent [19]

Herman et al.

[11] 4,219,811

[45] Aug. 26, 1980

[54] SYNTHETIC ARRAY AUTOFOCUS SYSTEM

[75] Inventors: Elvin E. Herman, Pacific Palisades; Frederick C. Williams, Topanga, both of Calif.

[73] Assignee: Hughes Aircraft Company, Culver City, Calif.

[21] Appl. No.: 548,040

[22] Filed: Feb. 7, 1975

[51] Int. Cl.² .............................................. G01S 9/02
[52] U.S. Cl. ................................................. 343/5 CM
[58] Field of Search ....................... 343/5 CM, 100 CL

[56] References Cited

U.S. PATENT DOCUMENTS

| | | | |
|---|---|---|---|
| 3,680,103 | 7/1972 | Houser et al. | 343/5 CM |
| 3,737,900 | 6/1973 | Vehrs | 343/5 CM |
| 4,170,006 | 10/1979 | Falk | 343/5 CM |

Primary Examiner—Malcolm F. Hubler
Attorney, Agent, or Firm—Walter J. Adam; W. H. MacAllister

[57] ABSTRACT

A system for automatically focusing a synthetic array through derivation of focus error signals which may be used such as by summing a priori data so that the synthetic array data may be optimally focused. Focus error data is derived by forming the synthetic array in three sub-array. The resultant outputs of these three sub-arrays are further processed together to extract data corresponding to the degree of total array defocus. For purposes of imagery generation, the phase and amplitudes of these three sub-array resultants are vectorially summed together and the resultant is magnitude detected to yield imagery output corresponding to the full synthetic array. For derivation of focus error data, the mean (bisector of the relative phase angle between the two end sub-array resultant vectors is measured. This derived bisector's phase angle is compared to the phase angle of the central sub-array resultant vector. The angle of the bisector relative to the central sub-array resultant is representative of the degree of defocus, and the sign of the angle is indicative of whether the array is over or under-defocused. For a properly focused array, the bisector of the two outer subarray resultants is in phase with the resultant vector of the center sub-array.

16 Claims, 32 Drawing Figures a) On Axis Targets
In Focus b) Off Axis Targets to Right
In Focus

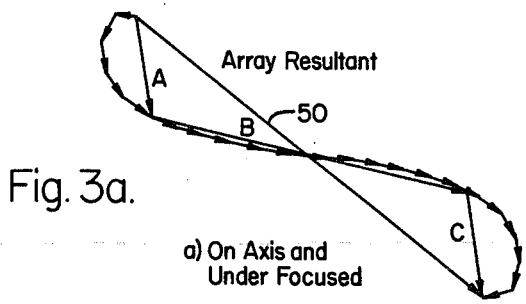
Fig. 3a.
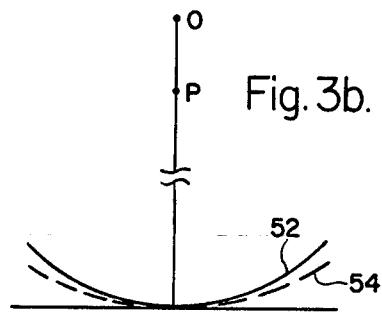
Fig. 3b.
Fig. 3c.
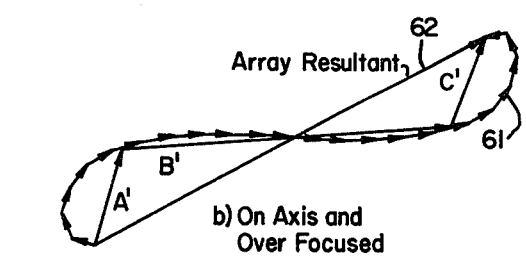
Fig. 4a.
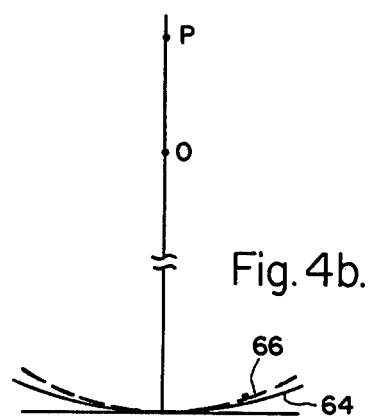
Fig. 4b.
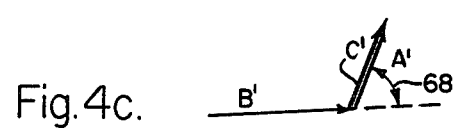
Fig. 4c.
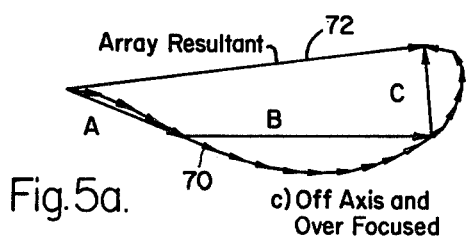
Fig. 5a.
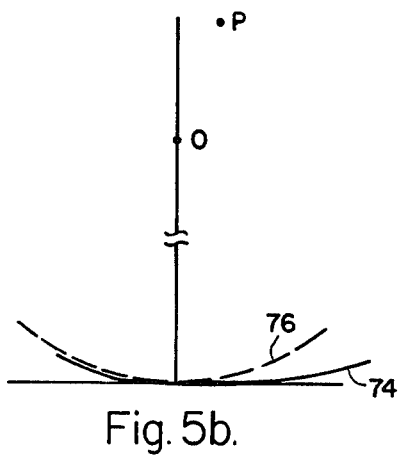
Fig. 5b.
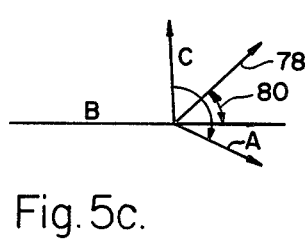
Fig. 5c.

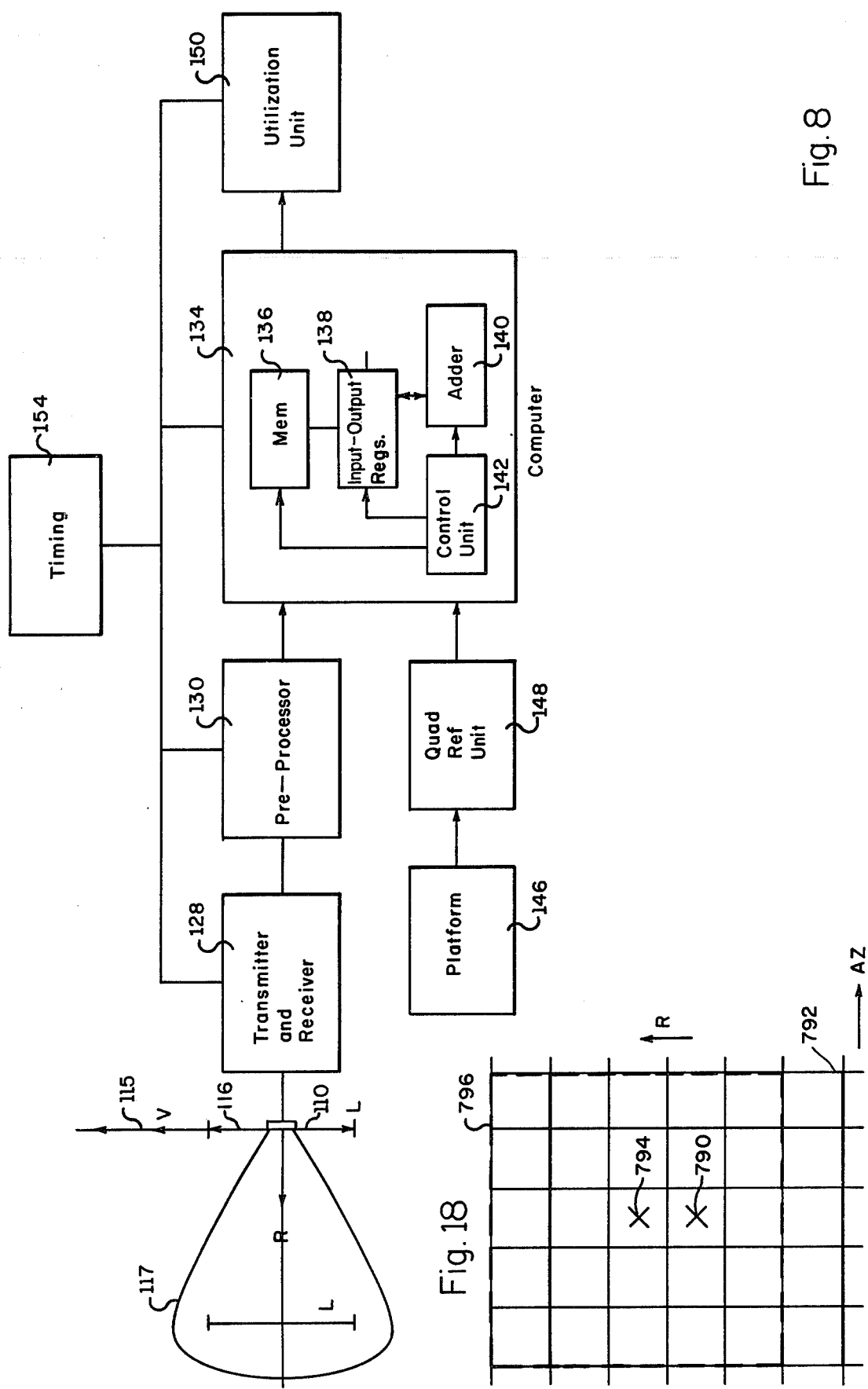

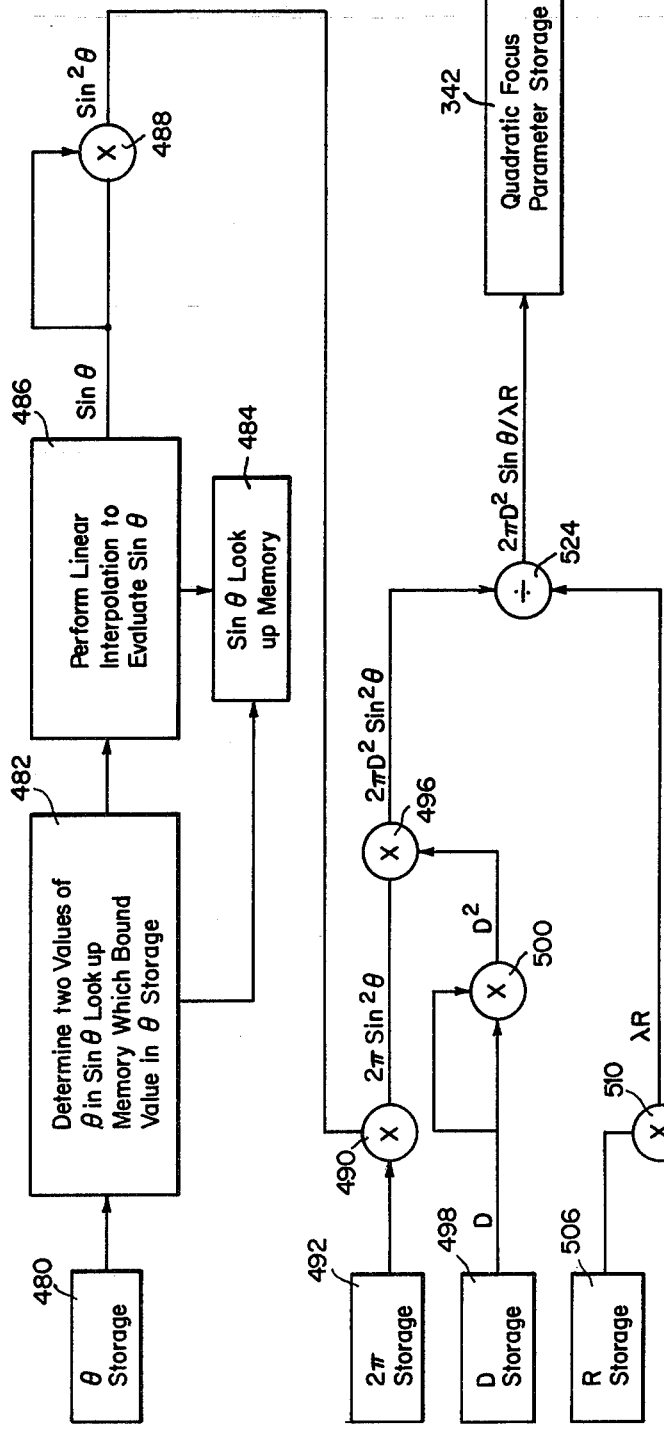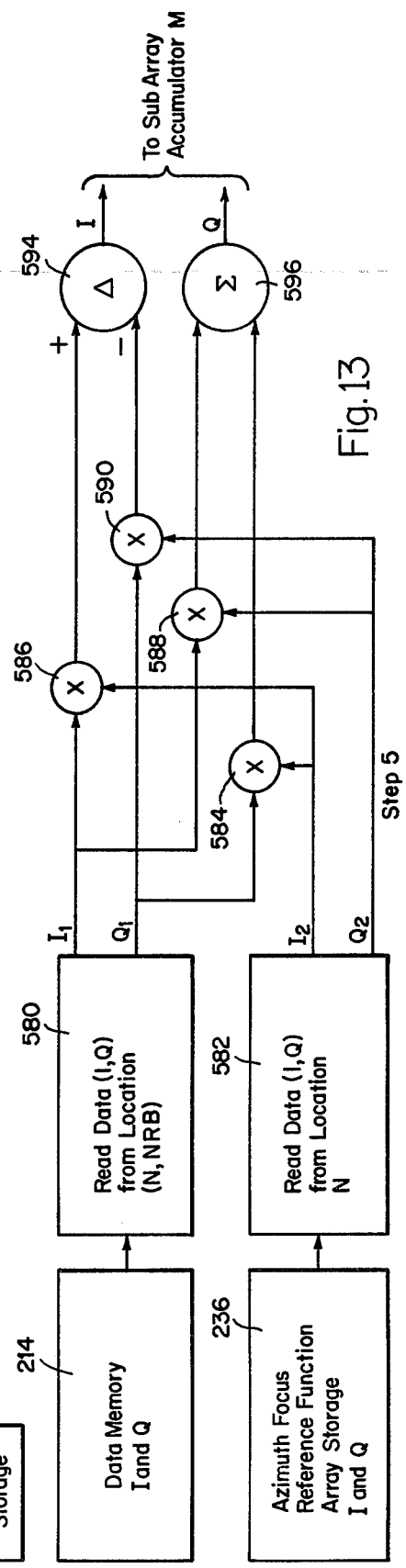
Fig. 11
Fig. 13

SYNTHETIC ARRAY AUTOFOCUS SYSTEM

BACKGROUND OF THE INVENTION

1. Field of the Invention

This invention relates to a radar processing system and particularly to a system for automatically focusing a synthetic array through derivation of focus error signals representative of required parameter changes in the processing of synthetic array image data.

2. Description of the Prior Art

Synthetic array processing requires that a quadratically varying phase correction i.e., an azimuth focus reference function be applied to the pre-summed sequentially derived signal vectors before integrating them, with (or without) amplitude weighting, to obtain each resolved element's amplitude. This quadratic azimuth focus reference function is calculated as a function of range, velocity, look angle and wavelength. Multiplication of successively derived signal vector returns from a particular ground scatterer by the quadratic focus reference function, and integration of the resulting products is in essence the correlation process. Many parameters may affect the accuracy of this quadratic phase correction such as a change in direction of the aircraft deriving the data, variations in the height of ground features, and errors in the velocity data which, even when derived from inertial platforms, may be only marginally accurate to achieve optimal focus. There are several known schemes for detecting cross line of sight velocity error or defocusing error, none of which have been found to be substantially satisfactory. One conventional method of correcting velocity data measures the target drift in successive tracking telescope synthetic array images; another scheme utilizes additional correlation filters i.e., outrigger correlation channels whose relative output amplitude is compared to derive a measure of defocus. In the latter scheme an overfocus correction is applied in one outrigger channel and an underfocus term is applied in the other. Magnitude detection is performed in each outrigger correction channel. The resultant signal vector magnitudes are then differenced to extract the magnitude and sign of the focus error. The former scheme is only suitable for a tracking mode of operation, both schemes have been found to be complex to implement digitally, and the latter has been found to suffer from focus error data contamination by off-axis targets i.e., ground returns not at the correlation peak.

SUMMARY OF THE INVENTION

Briefly this invention sets forth a system for automatically focusing a synthetic array by deriving focus error signals by comparison of correlation data derived from a selected number of synthetic sub-arrays. The total synthetic array may for example be broken into three contiguous subarays with the sequentially derived signals forming each sub-array are first pre-summed and then operated on by the respective segment of the quadratic focus reference function. These focused pre-sums are then integrated to derive the resultant phase and amplitude of each sub-array. In accordance with the invention the resultants of these three sub-arrays may be then used, by vectorial addition of the sub-array resultants, to yield a full array for imagery derivation. The out-of-focus condition of the system of the invention results in relative phase data from the three sub-arrays having a sign indicating whether the array is over-focused or under-focused, and having a magnitude that indicates the extent of defocus. The extraction of focus data does not require that the ground scatterers lie on axis i.e., at the synthetic array correlation peak, but provides highly reliable data for point scatterers either on-axis or at a substantial distance off-axis. In general the focus error term is extracted by measuring the relative phase angle of a first end sub-array vector resultant with respect to the other end sub-array vector resultant, bisecting this angle and comparing it with the phase angle of the central sub-array resultant. Because for a focused condition, the bisector of the two outer sub-array resultants is in phase with the resultant of the central sub-array for both on-axis and off-axis targets, this phase comparison provides an accurate measurement of the amount of defocus. Because complex targets may have more than one scatterer in a resolution cell thereby contaminating the focus error data, and the phase error measurements may also be derived on noise rather than specific targets, an arrangement is also provided to give proper relative emphasis to the focus error data selected for subsequent smoothing. To provide a continuous process of selection of focus error data on predominantly point scatterers, the imagery data on a certain area of the scene is averaged together to serve as a dynamically varying threshold reference against which to compare the imagery signal magnitude of the central resolution cell within. Whenever this local area average is exceeded by predetermined amount, the focus error data derived on that particular correlation of the central resolution cell may be entered into smoothing circuitry. By this gating arrangement which serves to select useful focus error correction data for smoothing, focus error data contamination that may be due to complex target phase interference effects is substantially minimized in accordance with the invention. The smoothed focus error data can be used in closed loop fashion to correct errors in the cross line of sight velocity input data to the synthetic array correlator in which the sub-array's formation circuits and quadratic focus reference function generator are a part thereof.

It is therefore an object of this invention to provide a synthetic array autofocus system that reliably provides focus information derived from the synthetic array correlation process itself.

Another object of this invention is to provide a system for automatically focusing a synthetic array but utilizing a minimum of equipment in addition to that required by the normal correlation process.

Another object of this invention is to provide a synthetic array autofocus system that accurately provides focus information both from ground scatterers lying both on-axis and substantially off-axis from the peak of the synthetically formed beam.

Another object of this invention is to provide an autofocus system to operate satisfactorily in the presence of complex scatterer returns having more than one scatterer in a resolution cell and operate satisfactorily in the presence of phase error measurements derive from noise signals.

It is still a further object of this invention to provide a synthetic array autofocus system that operates in a synthetic array processing system having a plurality of sub-arrays and which requires a minimum of equipment in addition to the processing equipment utilized for the synthetic array correlation process.

BRIEF DESCRIPTION OF THE DRAWINGS

These and other objects, features and advantages of the invention as well as the invention itself will become more apparent to those skilled in the art in the light of the following detailed description taken in consideration with the accompanying drawings wherein like reference numerals indicate like or corresponding parts throughout the several views wherein:

FIGS. 2c is a vector diagram showing the relative relationship of the sub-array vector resultants derived from the three sub-arrays of FIG. 2a.

FIG. 3a is a vector diagram showing how signal vectors add across the array for an on-axis target when an under-focused condition exists.

FIG. 3b is a plan view showing the (exaggerated) corresponding geometry between a straight line flight path and an on-axis point scatterer P, where the array is focused on point O, along with corresponding arcs of constant phase across the array; the condition shown is one of under-focus.

FIG. 3c is a schematic vector diagram for explaining the derivation of the focus error signal for the condition of FIG. 3a.

FIG. 4a is a schematic diagram showing how signal vectors add across the array for an on-axis target, but in an over-focused condition.

FIG. 4b is an exaggerated plan view of the scatterer-flight path geometry, along with arcs of constant phase for both scatterers P and the point of focus O.

FIG. 4c is a vector diagram.

FIG. 5a is a schematic diagram showing how signal vectors add across the array for a combination of a target lying both off-axis to the right and for an over-focused condition.

FIG. 5b is a plan view of the scatterer-flight path geometry along with arcs of constant phase for both off-axis scatterer P and the point of focus O, corresponding to the phase diagram of FIG. 5a.

FIG. 5c is a vector diagram for explaining the derivation of the focus error signal from the array condition of FIG. 5a.

FIG. 8 is a schematic block diagram with a synthetic array processing system for explaining the autofocus system in accordance with the invention.

FIG. 11 is a schematic and flow diagram for further explaining the initial computation of the quadratic focus parameter.

FIG. 13 is a schematic and flow diagram for further explaining step 5 of FIG. 10.

FIG. 18 is a schematic diagram of a portion of the synthetic array for further explaining that any suitable local area may be utilized for the determination of the validity of the focus area in accordance with the invention.

DESCRIPTION OF THE PREFERRED EMBODIMENT

Figure 1A:
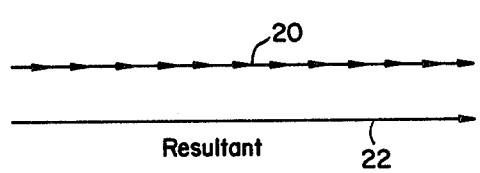
FIG. 1a is a vector diagram showing how the signal vectors add across the array for an optimally focused on-axis target, i.e., one lying at the correlation peak of the synthetically formed array.

Before proceeding to the drawings, the autofocus concept in accordance with the invention will be generally explained. The formation of a high resolution synthetic array requires that a quadratic focusing reference function be applied to the coherent raw data so that all signal vectors in the array add in phase at the correlation peak which is generally at the center of the synthetic array. The focus reference function in essence phase rotates each signal or pre-sum vector to accommodate the fractional wavelength two-way path length difference between each data point along the array (flight path) and a corresponding point on a segment of an imaginary perfect circle around each target. The azimuthal focus reference function is thus dependent on range, pointing direction, deviations from a straight-line flight path, and flight velocity. Range data of sufficient accuracy is available directly because it corresponds to the echo return time. However flight velocity data is typically derived from an inertial platform or other sensor such as a doppler navigator. As is well known, inertial platforms typically provide good acceleration data but their velocity accuracy degrades substantially as the duration of the flight increases. For synthetic arrays of very fine resolution, especially at long standoff distances, the cross-line of sight velocity data accuracy required for perfect focus is quite critical if good sidelobes are to be maintained. Although the autofocus system in accordance with the invention responds to all errors contributing to defocussing such as range, directional changes, and velocity changes, velocity errors have been found to be a main contributor. If a velocity error exists, the end vectors of a synthetic array being processed will be substantially out of phase with respect to those signal vectors composing the central portion of the synthetic array, with a resulting sidelobe degradation. The principles in accordance with the invention operating as an autofocused array or a closed loop feedback system minimizes the cross-line-of-sight velocity accuracy problems as well as many other contributors to focus degradation. It should be noted that, since this autofocus system requires smoothing of the derived focus error data, it does not correct for effective short-term aircraft positional errors along the flight path whose duration are comparable to or less than the time required to fly an array length. These corrections are normally formed from data derived from accelerometers.

In the formation of a real or synthetic array there exists extractable data which can serve to indicate by its sign whether or not the array is overfocused or underfocused, and by its magnitude the degree of defocus. In the auto-focus system of the invention, the synthetic array is considered as being divided into a selected number of sub-arrays and is illustrated as being divided into three contiguous focused sub-arrays; the left-hand sub-array, the central sub-array and the right-hand sub-array. It is to be noted that with the processing system illustrated, the system utilizes the three sub-arrays in the normal synthetic array correlation process to derive imagery. Furthermore in the illustrated system in which the array is broken into sub-arrays the data necessary for focus error derivation is directly extractable. When amplitude weighting over the total array is utilized to minimize sidelobes, the corresponding weighting over each sub-array that is appropriate for low imagery sidelobes is also appropriate for the auto-focus system of the invention.

The pre-summed vectors and focused vectors comprising an optimally focused synthetic array are in phase if the point target lies at the center of a synthetically formed beam. For targets off beam-center but optimally focused, the linear phase term causes the vectors across the array to be linearly phase rotated with respect to each other and when summed to form a semi-circle. If quadratic phase error or defocusing is present, the bisector of the angle between the resultant vectors of the end sub-arrays, A and C lags the resultant vector of the central sub-array B, for an underfocus case; this bisector leads the resultant vector of sub-array B for the overfocus case. Thus it has been found that if three sub-arrays are formed with the central sub-array resultant vector as a phase reference, behavior of the bisector of the two end sub-array resultant vectors, yields a magnitude corresponding to the degree of defocus and sign indicative of whether the synthetically formed beam is overfocused or underfocused. Furthermore it has been found that additional linear phase changes over the array due to a target off-axis but within the synthetically formed main beam does not significantly affect the measurement of the quadratic phase error. The bisector of the angle between the end sub-array resultants may be measured with respect to the central sub-array B resultant directly, or it can be measured with respect to an arbitrary phase reference and compared with the phase angle of the central sub-array with respect to that same arbitrary phase reference. It is to be noted that if a circle is flown around the target point, phase correction would not be required. The focusing process when flying a straight line or curved path other than a circle is therefore one of applying at each sample point along the array the appropriate phase corrections corresponding to the two-way path length spacing between the straight line flight path and a circular arc around a given ground scatterer or target. When the quadratic focus correction derived in accordance with the principles of the invention are applied to correct for cross-line-of sight velocity errors, the signal vectors for any point target or ground scatterer add in phase when the scatterer is on the center of the synthetically formed beam and sum into a circular segment when the scatterer is off-axis. The optimal quadratic focus reference function is not critically dependent on range, thus all arrays have a depth of focus that is inversely dependent on array length. When the range extent of the ground swath coverage exceeds the synthetic array depth of focus, this focus correction as a function of range is accommodated for in the computed quadratic phase reference function to which the derived and smoothed focus error term is added.

Figure 1B:
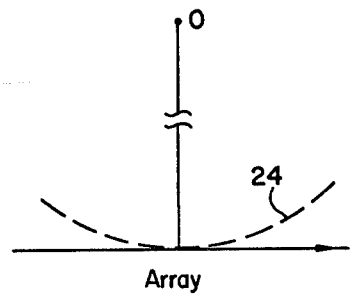
FIG. 1b is a plan view sketch showing in exaggerated fashion the geometry between a straight line flight path and a point scatterer O, along with a circular arc representing a line of constant echo phase with respect to scatterer O.

Referring now to FIGS. 1a and 1b, the presummed vectors from an optimally focused on-axis point target add in phase as shown by the vector sequence 20 to provide a linear resultant, i.e., the target lies at the peak of the synthetically formed beam. The signal vector summation 22 results from applying an optimal quadratic focus reference function to the data sequentially derived along the straight line flight path shown in FIG. 1b, phase correcting each signal presum vector in accordance with this quadratically varying focus reference function, so that the phase of each presum vector 20 is the same as if an arc of constant phase 24 were flown around point O. Thus the array shown in FIGS. 1a and 1b is optimally focused, and the target lies at the center of the synthetically formed beam. In the geometry shown in FIG. 1b, the pointing direction of the synthetically formed beam is at a right angle with respect to the flight path. However it is recognized in the art that, with appropriate changes in the quadratic focus reference function, beam pointing can be directed at other angles, and curved flight paths can be accommodated. Besides the application of the focus reference function, amplitude weighting may be applied to the presum vectors across the array so as to reduce sidelobes.

Figure 2A:
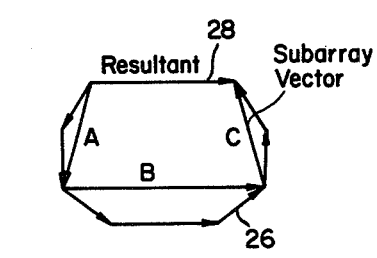
FIG. 2a is a vector diagram showing the individual vectors and their sub-array and total array resultants, corresponding to a synthetic array with the target off-axis to the right of the array center, but under an optimally focused condition.
Figure 2B:
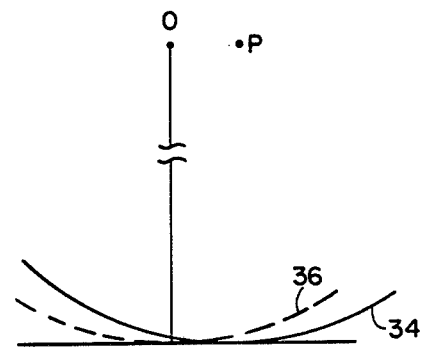
FIG. 2b is a plan view showing the (exaggerated) physical geometry between a straight line flight path and an off-axis-to-the-right scatterer P, along with circular arcs representing lines of constant echo phase with respect to scatterers P and O.
Figure 2C:
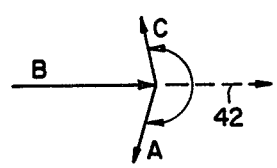

Referring now to FIGS. 2a, 2b and 2c, a point scatterer P, FIG. 2b is positioned off-axis to the right with respect to the center of the synthetically formed beam. Here again the array is optimally focused but the off-axis location of target P causes the relative phase of the vector presumes across the array 26 to rotate linearly and form a segment of a circle giving rise to sub-array resultants, A, B and C, and an overall array resultant 28, corresponding to the vector summation of sub-array resultants A, B, and C. For the condition shown, the target is at point P to the right of the beam center as shown in FIG. 2b, where an arc of constant phase is represented by curve 34. However since the synthetically formed beam is pointed at O, the applied quadratic phase correction corresponding to arc 36, symmetric with respect to point O gives rise to a linearly increasing phase between adjacent presum vectors progressing from left to right across the entire array. The relative phase relationship between the sub-array resultants is shown in FIG. 2c, where the bisector of the phase angle between sub-array resultant A and C lies in phase with sub-array resultant B.

It is to be noted that, although not illustrated, for a point target to the left of the array center in response to the quadratic focus correction which directs the synthetically formed beam at point O, a linearly decreasing phase relationship exists between adjacent focused presum vectors, progressing from left to right across the entire array.

Referring now to FIGS. 3a, 3b and 3c for an under-focused condition with the target on-axis at point P in FIG. 3b but with the array focused at point O, the sub-array resultants A, B, and C are derived as shown in FIGS. 3a and 3c. When vectorally summed together they yield the overall array resultant shown by line 50. The magnitude of this vector line 50 is a measure of the total array correlation integral, i.e., the imagery amplitude for that particular resolution cell.

In FIGS. 3a, b, and c, processing is done as if the target were at point O as shown in FIG. 3b, but the target represented is actually closer, at point P, with the quadratic focus term being applied corresponding to a segment of a circular arc 54, resulting in an under-focus correction for the actual target location P. The optimal focus correction for target location P corresponds to a constant phase line of greater slope, arc 52. Thus the array is under-focused for point P. This under-focus phase error which quadratically varies over the array, results in symmetric phase lags in the end vectors of the array with respect to those in the center of the array. With the target scatterer at point P, on-axis, but with the array in an under-focused condition, the sub-array resultant vectors are shown in FIGS. 3a and 3c. In the latter figure it can be seen that sub-array resultant vectors A and C coincide but lie at a negative angle with respect to sub-array resultant vector B. The magnitude of this angle 60 is indicative of the degree of defocus and its negative sign indicates an under-focus condition.

Referring now to FIGS. 4a, 4b and 4c which represent an overfocus condition with a point target at point P, but with the array focused at a closer range, i.e., point O, the outer sub-array resultant vectors A and C are parallel as shown in FIGS. 4a and 4c. However, for this over-focus condition, they lie at a positive angle 68 with respect to sub-array resultant vector B. Again the magnitude of angle 68 in FIG. 4c is a measure of the degree of defocus and the positive sign of the angle is indicative of over-focus. Here again the magnitude of the total array vector line 62 in FIG. 4a corresponds to the imagery amplitude for the particular resolution cell corresponding to that array correlation.

It will be noted that, for targets, i.e., ground point scatterers which lie at the center of the synthetically formed beam, i.e., where the correlation is a peak, the two outer sub-array resultant vectors are parallel to one another. Thus their bisector is at the identical angle. As the target is moved off-axis, the two end sub-array vectors will separate in angle, but their bisector will remain substantially at the same angle with respect to the central sub-array vector resultant.

Referring now to FIG. 5a which shows the condition where the target is off-axis to the right at a point P of FIG. 5b and the array is over-focused, since it is focused at a nearer range O, the sub-array resultant vector relationships are shown in FIGS. 5a and 5c. The magnitude of the overall array resultant vector 72 is representative of the imagery amplitude for that particular resolution cell. As shown in the geometry of FIG. 5b, the circular segment curve 74 represents a line of constant phase with respect to point P but the applied quadratic focus reference corresponds to a constant phase arc 96 around point O. Thus, on the left end of the array, the applied phase correction is nearly correct. However on the other end of the array, the linear off-axis phase error adds to the quadratic phase error resulting in the asymmetric vector phase summation over the array shown in FIG. 5a.

For this combined over-focused and off-axis right condition, the end sub-array resultant vectors A and C shown in FIGS. 5a and 5c no longer coincide in angle. Their bisector 78 is shown in FIG. 5c making a positive angle with respect to sub-array resultant vector B. Here again the magnitude of the angle 80 is indicative of the degree of defocus and the positive sign of the angle indicates an over-focus condition.

Figure 6:
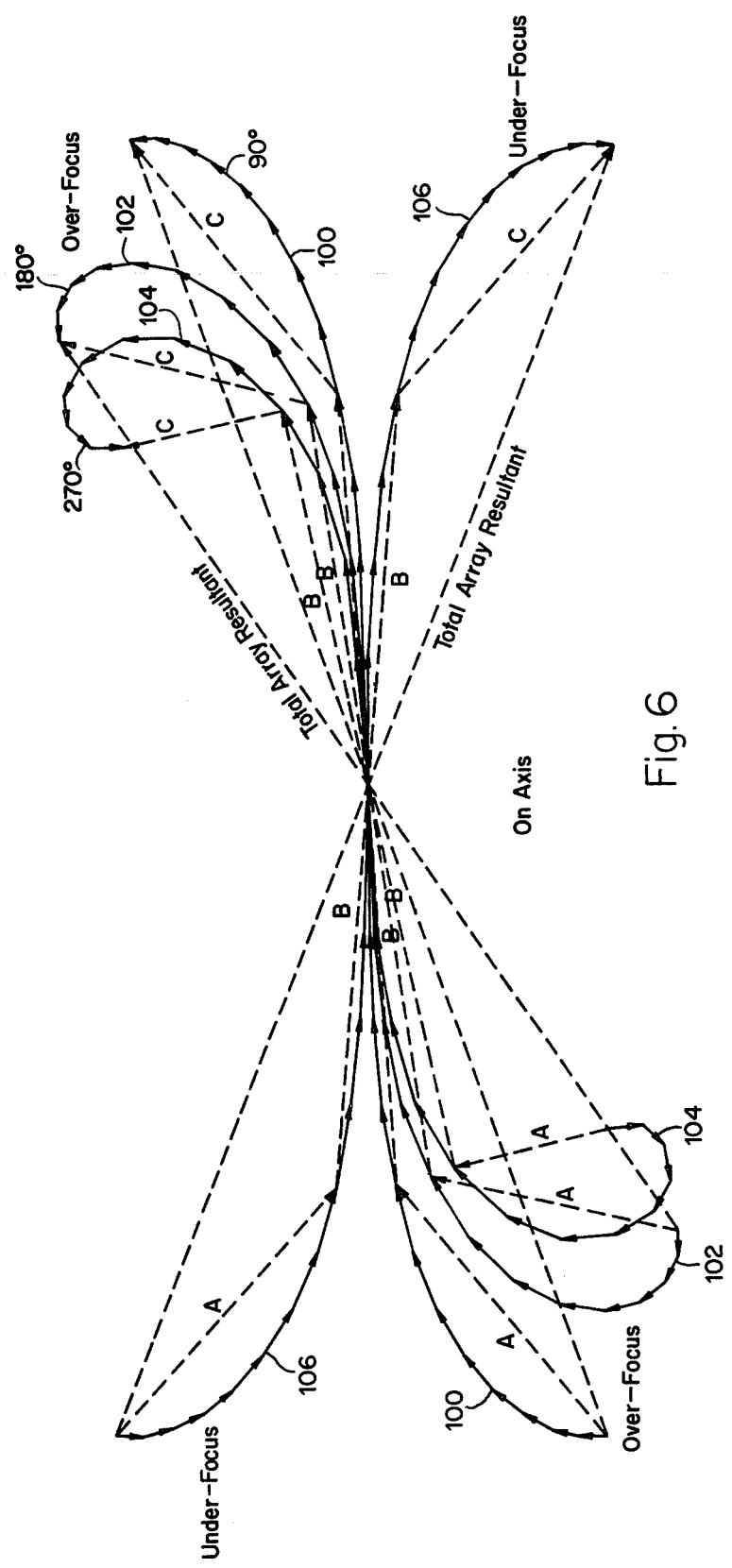
FIG. 6 is a schematic vector diagram showing for an on-axis target the quadratic vector phase relationships across the array for three conditions of over-focus, 90 degrees, 180 degrees, and 270 degrees center-to-array-end, and for one condition of under-focus i.e. 90 degrees quadratic phase change from array-center-to-end. Also shown are the corresponding sub-array resultants.

Referring now to FIG. 6 which shows an array vector summation for an on-axis point target for both quadratic under and over-focus, the quadratically changing phases of the individual presum vectors comprising the total arrays can be seen for vector curves 100, 102 and 104 respectively representing increasing over-focused conditions of 90 degrees, 180 degrees, and 270 degrees from array center-to-end. A vector curve 106 represents the under-focused condition for 90 degree quadratic under-focus from array center-to-end, and has the same contour as the curve 100, but has opposite inclination. It has been found that there is a proportionality between the cross-line-of-sight velocity error and the total quadratic phase change over the array, and a proportionality between the total quadratic phase change over the array and the phase angle between the central sub-array resultant and the bisector of the angle between the two outer sub-array resultants. Therefore, there is a proportionality between the cross-line-of-sight velocity error and the angle that the central sub-array resultant makes with respect to the bisector of the two outer sub-array resultants. It has been shown analytically and by operating processing equipment that this proportionality maintains substantially correct for all locations of a point target within the mainlobe of the synthetically formed beam.

Figures 7A, 7B:
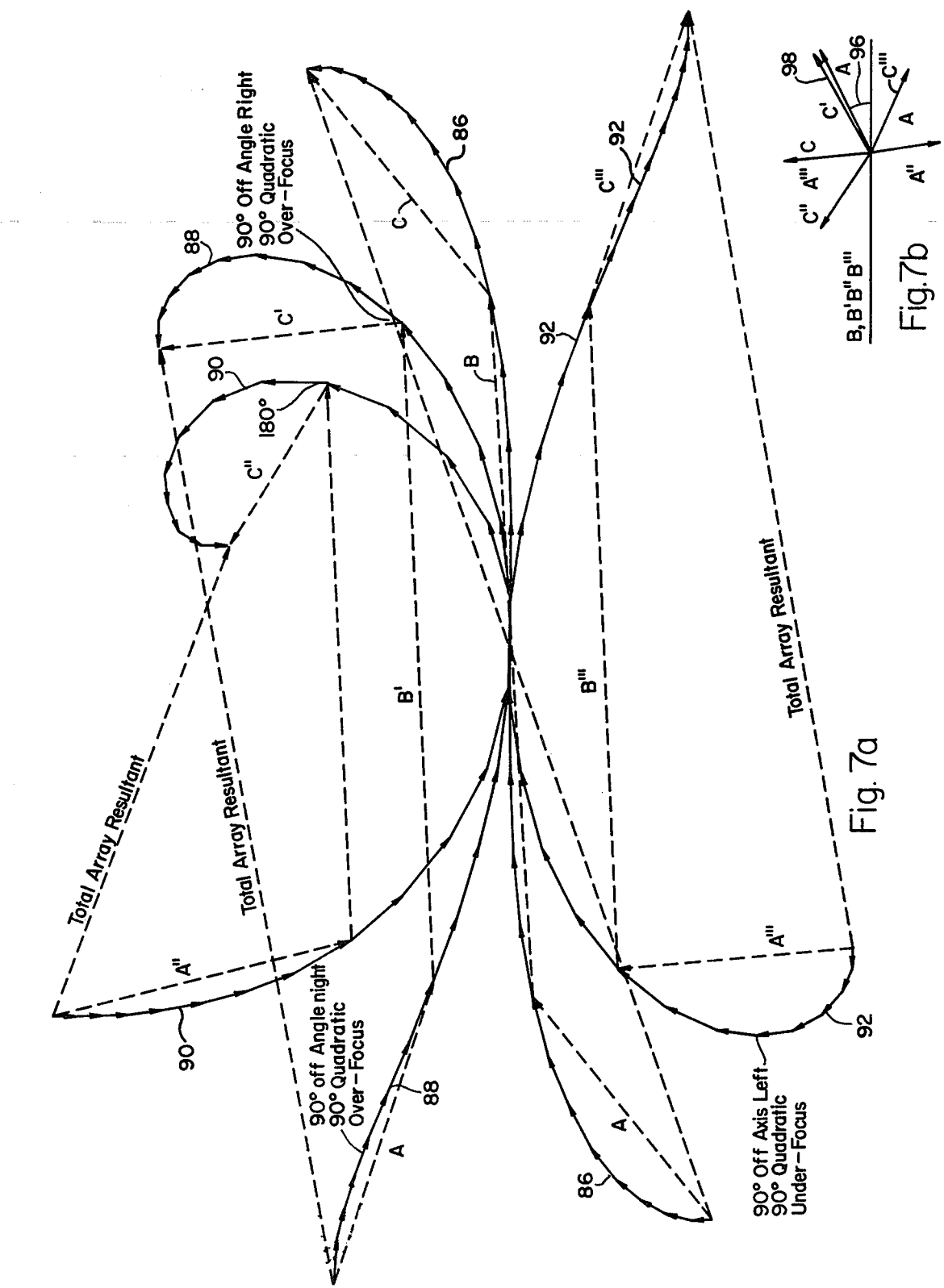
FIG. 7a is a schematic diagram showing the vector additions across the synthetic array for on-axis, for several off-axis-right target conditions, and for one off-axis-left target condition, and with a constant overfocus error from center-to-end of the array of 90 degrees.
FIG. 7b is a vector diagram for explaining the relative effect on sub-array resultant phase relationships as the target moves off-axis for a constant degree of over-focus.

Referring now to FIGS. 7a and 7b, vector curves 86, 88, and 90 are shown for an over-focused condition and respectively represent conditions of a point target on-axis, 90 degrees off-axis to the right, and 180 degrees off-axis to the right (the angle nomenclature indicating the total phase shift across one-half of the synthetic array, i.e., from array center to its end). The changing conditions of the resultants of the total arrays, and the resultant vectors of the three sub-arrays are shown for each position off-axis, relative to the vector resultant of the central portion of the synthetic beam being processed. It should be noted that the vector curve 86 has a symmetric configuration for an over-focused, on-axis condition. The asymmetric vector curve 92 represents a point target position off-axis to the left and with a quadratic over-focus condition giving rise to a 90 degree quadratic phase error from array center-to-end.

Referring now to FIG. 7b, and examining the bisector between the resultant vectors A and C of the two outer sub-arrays of curve 86, and referencing its phase to the phase of the corresponding central sub-array resultant vector B of curve 86, it is seen that for the on-axis condition, the bisector 98 is the same, i.e., it lies coincident with the resultant vectors A and C of the end sub-arrays. The focus error angle 96 is formed relative to the resultant vector B of the central sub-array. For the resultant vectors A' and C', the bisector is also positioned coincidently at the bisector 98 angle, and the focus error angle 96 is the same as for the on-axis condition since both of the vector curves represent a 90 degree quadratic over-focus condition. For the 180 degree off-axis condition of the vector line 90, the bisector of the vectors A" and C" also lie at the same angle and coincident with vector 98. For the underfocused condition, the vector A''' and C''' also have the same bisector 98 relative to the resultant vector B''' of the corresponding central sub-array. It can be seen that the sign of the error angle indicates whether the array is over-focused or under-focused. It is to be noted that the autofocus principles in accordance with the invention are not limited to any particular synthetic array system but are applicable within the scope of the invention to any type of synthetic array process or other processing system in which data over an extended array length is processed and requires focusing corrections.

Referring now to FIG. 8, for obtaining the synthetic array data, the aircraft flies along a straight line or other prescribed path 115 with a velocity V and transmits coherent radar pulses from a suitable antenna such as an antenna array 110 in a direction to the side of the aircraft either broadside as illustrated, or at a suitable squint angle relative to the flight path. The range dimension R is measured substantially along the center of a beam 117. In forming a continuous mapping synthetic array it is necessary that each scatterer which is to be mapped be illuminated by the radar antenna beam from all points along the array length. The coherent sequential pulse echo returns from each ground scatterer thereby derived are operated on in subsequent processing so that they can be coherently added to form a fine azimuth resolution beam substantially equivalent to a real receiving antenna of a length L equivalent to that of the synthetic array. Thus the physical beamwidth of the real antenna 110 is at least as broad as the synthetic array length 116 (L) at the range R.

The system includes a coherent radar transmitter and receiver 128 which may be any conventional or suitable type to provide signals to a pre-processor 130 which in the illustrated system, performs the azimuth pre-summing and optionally range pulse compression and applies the presum vectors to a computer 134, or any special purpose digital analogue, or hybrid processor to perform the azimuth correlation process as well as the autofocus error derivation in accordance with the invention. Correlation and development of the autofocus correction in the illustrated system is provided by the computer 134 operating with other system hardware. The computer 134 may be of any conventional type and the illustrated computer may include a memory 136, suitable input and output registers 138, an adder 140 and a control unit 142. Operating from an aircraft to form synthetic arrays a platform 146, which characteristically utilizes three accelerometers provides a velocity reference signal to a quadratic reference function unit 148 which supplies a suitable quadratic reference function to be used in the correlation and processing operation in the computer 134. In the illustrated system, the focus error signal derived in the computer 135 and representative of any de-focused condition is smoothed and utilized in the quadratic reference unit 148, for correction of the focus of the reference function employed in the synthetic point targets array processing. The imagery data is applied from the computer 134 to a suitable utilization unit 150 which may be either a recorder or a suitable display. Timing control is provided from a timing and clock unit 154 and applied to the various units of the system.

Figure 9A:
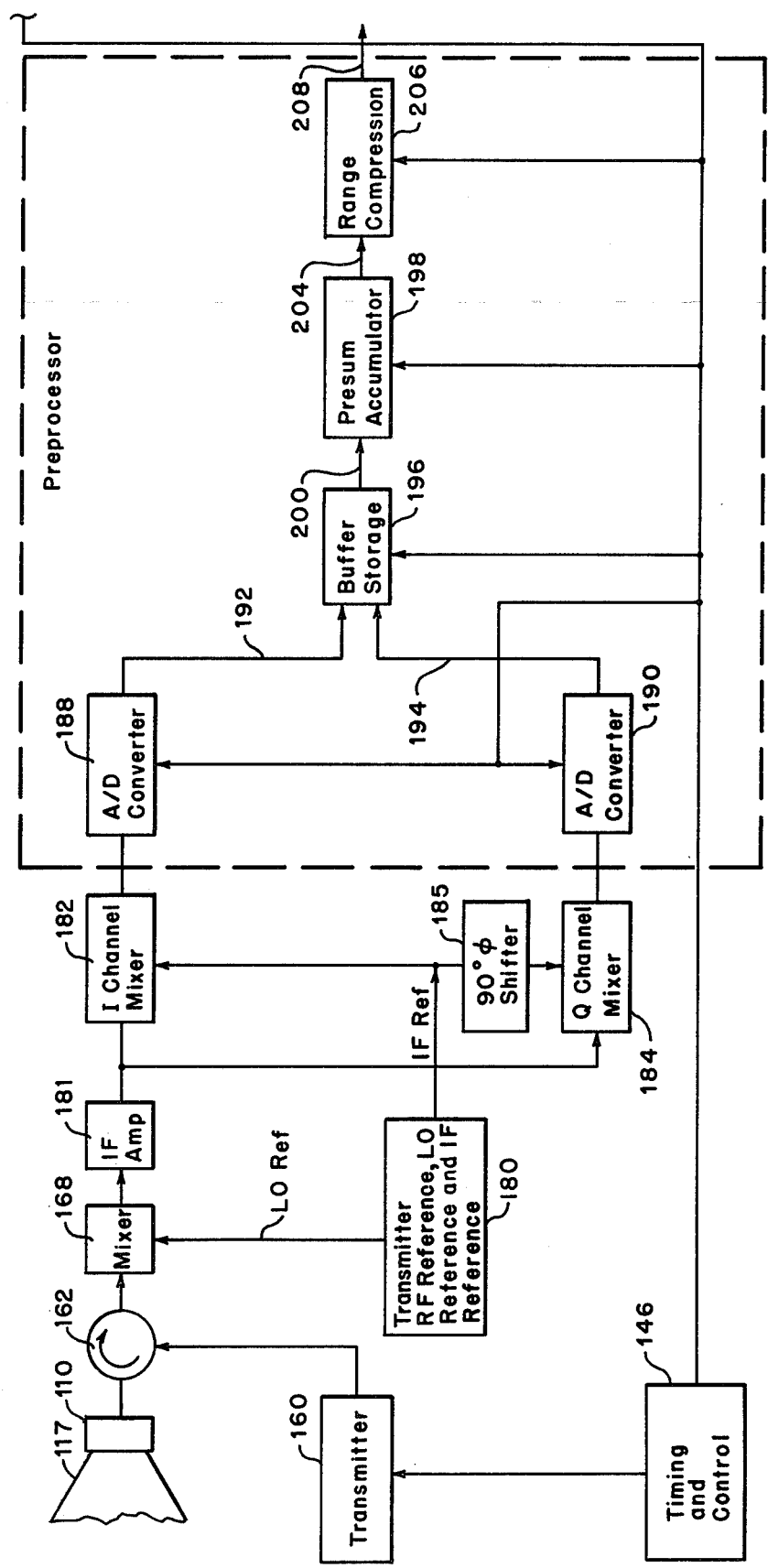
FIGS. 9a, 9b and 9c are schematic block diagrams of the synthetic array processing system having the focus error derivation and system and as an illustrative example, a closed-loop correction system operating in accordance with the invention.

Referring now to FIG. 9a, a synthetic array radar system is shown incorporating a synthetic array processor unit that may be utilized with the autofocus system in accordance with the subject invention. The timing and control unit 146 applies synchronizing pulses to a conventional coherent pulse transmitter 160, which in response thereto develops coherent output pulses of radio frequency (RF) energy which are applied through a duplexer 162 to the antenna 110 for transmission into space. The transmitter RF reference and the coherently related LO reference in the unit 180 are well known in the art and may be mechanized for example by a stable oscillator and associated circuitry for multiplying this frequency to the RF frequencies required for the transmitter and for the LO signal required by mixer 168. The IF reference can be derived directly from the stable oscillator source in unit 180.

The RF output pulses to the antenna 110 are radiated as an illuminating beam 117 and may be directed to a desired area of the terrain for example. The RF energy received from ground scatterers or point targets within the antenna pattern 117 is applied from the antenna 110 through the duplexer 162 to the mixer 168. A suitable local oscillator and IF reference source 180 applies the local oscillator (LO) signals to the mixer 168 which translates the received RF energy to an intermediate frequency band. The output signal from the mixer 168 is applied to a wideband IF amplifier 181, and the coherent IF signal from the IF amplifier 181 is then split and applied to an in-phase (I) channel mixer 182 and a quadrature (Q) channel mixer 184, one receiving an in-phase IF reference signal and the other a 90 degree phase shifted IF reference through unit 185. Mixers 182 and 184 respectively provide in-phase and quadrature phase detection so that the output may be respectively represented as A cosine B, and A sine B where A is the length of the vector and B is the phase angle relative to the phase of the IF reference signal. Analog-to-digital units (A/D) 188 and 190 respectively sample in-phase and quadrature video signals from the mixers 182 and 184 and convert the video signals to digital words of the desired precision. Digital words that represent the value of the in-phase and quadrature signals are applied from the converter units 188 and 190 on respective composite leads 192 and 194 to a buffer storage unit 196 which operates as a time-expander. The buffer storage unit 196 accepts incoming digital bipolar coherent video at the analog-to-digital conversion rate and reads out the data at a slower rate to spread the data essentially over an interpulse period, allowing the subsequent circuits to operate at a relatively low clock rate. The buffer storage unit 196 may for example store 200 range cells of data for a single sweep, i.e., it stores as a result of each transmission, the digital I and Q echo signals over the swath of interest.

The in-phase and quadrature binary data words are shifted out of the buffer storage unit 196 into a presum and accumulator unit 198 through a composite lead 200.

The presum accumulator 198 serves to add without phase correction a limited number of range sweeps to further reduce the number of information packets to be subsequently processed, and integrating several successive range sweeps. Upon receipt of the data signals from a selected number of sequential range sweeps such as 8 adjacent range sweeps they are coherently summed or accumulated to provide a presum vector for each range resolution element. The presum signals from the presum accumulator unit 198 are then applied through a composite lead 204 to a range compression unit 206 which may be of any conventional type to compress the data. The range compression unit 206 may be of a conventional correlator arrangement in which uncompressed pulses that have been received from a point target are compressed in a time scale with a compression ratio, for example, of 100 to 1.

Figure 9B:
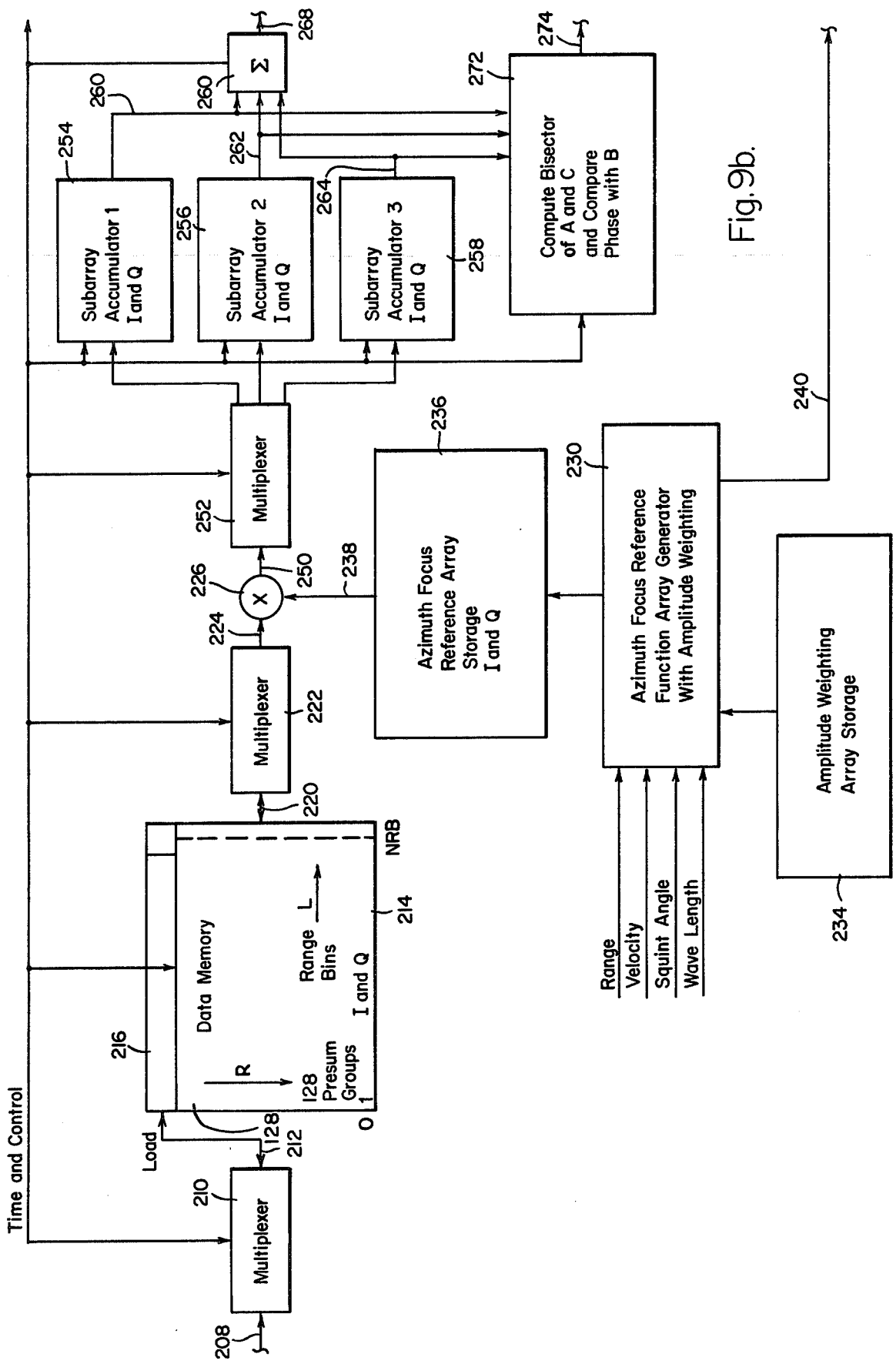

Referring now principally to FIG. 9b, the now buffered, presummed and range pulse compressed coherent signals are applied on a composite lead 208 to the suitable multiplexer unit 210 and are stored after application through a composite lead 212 in a data memory 214. It is to be noted that in the illustrated system, the presum operation in the azimuth array results in a total of 128 azimuth presum vectors across the total array, which it is understood is not to be limiting but is only given as an illustrative example for purposes of explanation. As the principles of the invention are illustrated in a continuous operating processing system, the data memory 214 may include 128 channels or presum groups which may be considered to function as shift registers in the range dimension and which has a width of 200 range bins or cells. A presum channel which can be called "0" channel 216 in data memory 214 is provided for loading in new data and during each channel loading period receives 200 I and Q binary words which are shifted to the right toward the output position. At the end of each loading period, the data in the channel 216 is shifted downward into the number 1 presum channel and the data in the 128th presum channel is shifted out of the memory or written over. The output data is taken for each range cell over the 128 presum channels at the right-hand of the memory during the period that the new data is shifted into the input channel 216. All of the range data shifted out is recirculated in the 128th presum channels during the period of loading the channel 216. Signals read from the memory 214 are applied through a composite lead 220 through a suitable multiplexer unit 222 which is controlled by timing and control signals to sequentially sample each of the 128 azimuth presum channels at each range position. After each multiplexed and clock readout the data in all presum channels is clocked and shifted one step to the right in the memory.

Signals from the multiplexer 222 are applied through a composite lead 224 to a suitable phase rotater or multiplier 226 which rotates the I and Q signal vectors in response to the quadratic focus reference signal. It thus (for perfect focus) corrects the relative phase of the presum vectors for each range element as if they had been derived along an arc of constant phase with respect to the target. An azimuth focus reference function generator 230 is provided to respond to parameters such as range, velocity, squint angle, and wavelength to generate quadratic focus reference signals for operating on the in-phase and quadrature echo presums. Suitable amplitude weighting may also be included in the azimuth reference function generator 230 to amplitude weight the presums across the array. It is to be noted that the velocity signal applied to the generator 230 is normally derived from an inertial platform and may be the subject of errors so that the quadratic reference function does not provide optimal focusing. Amplitude weighting is often utilized, and is generated in the amplitude weighting array storage unit 234. Storage amplitude weighting values are sequentially applied to the unit 230. A storage unit 236 may store the azimuth focus reference function and the amplitude weighting for both in-phase and quadrature for each of the 128th azimuth presum groups to be sequentially applied through a composite lead 238 to the multiplier 226. A composite lead 240 applies the smoothed focus error correction signal to the azimuth focus reference function generator 230 for correcting that reference function in response to the smoothed focus error signal generated in accordance with the principles of the invention.

The amplitude weighted and quadratically phase corrected vectors are applied from the vector rotator 226 through a composite lead 250 to a suitable multiplexer 252 where by proper timing they are distributed to first, second and third sub-array accumulators 254, 256 and 258 which respectively may add 43, 42 and 43 azimuth presum groups for one range bin. It is to be noted that the number of azimuth presum groups is substantially equal in each accumulator so that the total sum over the array is 128. The vector summation of 43 azimuth presums in the two outermost sub-array accumulators provides the resultant presum vectors for the two end sub-arrays, A and C, while the vector summation of 42 azimuth presums from the center of the array are accumulated to provide the sub-array resultant vector for the central sub-array B. The three sub-array resultant vectors A, B, and C are utilized in accordance with the invention to derive the focus error signal.

The system of the invention is not limited to any particular type of processing system but may be utilized with processing systems having a greater number of sub-array channels.

The resultant vectors from the sub-array accumulators 254, 256, and 258 are applied through respective composite leads 260, 262, and 264 to a suitable vector summing unit 266 for developing imagery data. The output of the vector summing unit 260 is provided on composite lead 268 to the vector magnitude computer 280. This magnitude can be derived from the I and Q values of the total array resultant by any conventional scheme such as the square root of the sum of I squared plus Q squared. This magnitude value, i.e., imagery amplitude data is applied on composite lead 282 to the display unit 150 for example or to any other suitable imagery utilization unit. The sub-array resultant vector outputs from sub-array accumulators 254, 256, and 258 are applied through respective composite leads 260, 262 and 264 to unit 272 to compute the bisector of the phase angle between the two outer sub-array resultant vectors, A and C, and to compare the phase angle of the bisector with the phase angle of the central sub-array resultant vector 10. Phase error data, including magnitude and sign are then applied through a composite lead 274 for determination of whether each instantaneous error data is of suitable quality for smoothing and subsequent utilization in the focus correction operation.

Figure 9C:
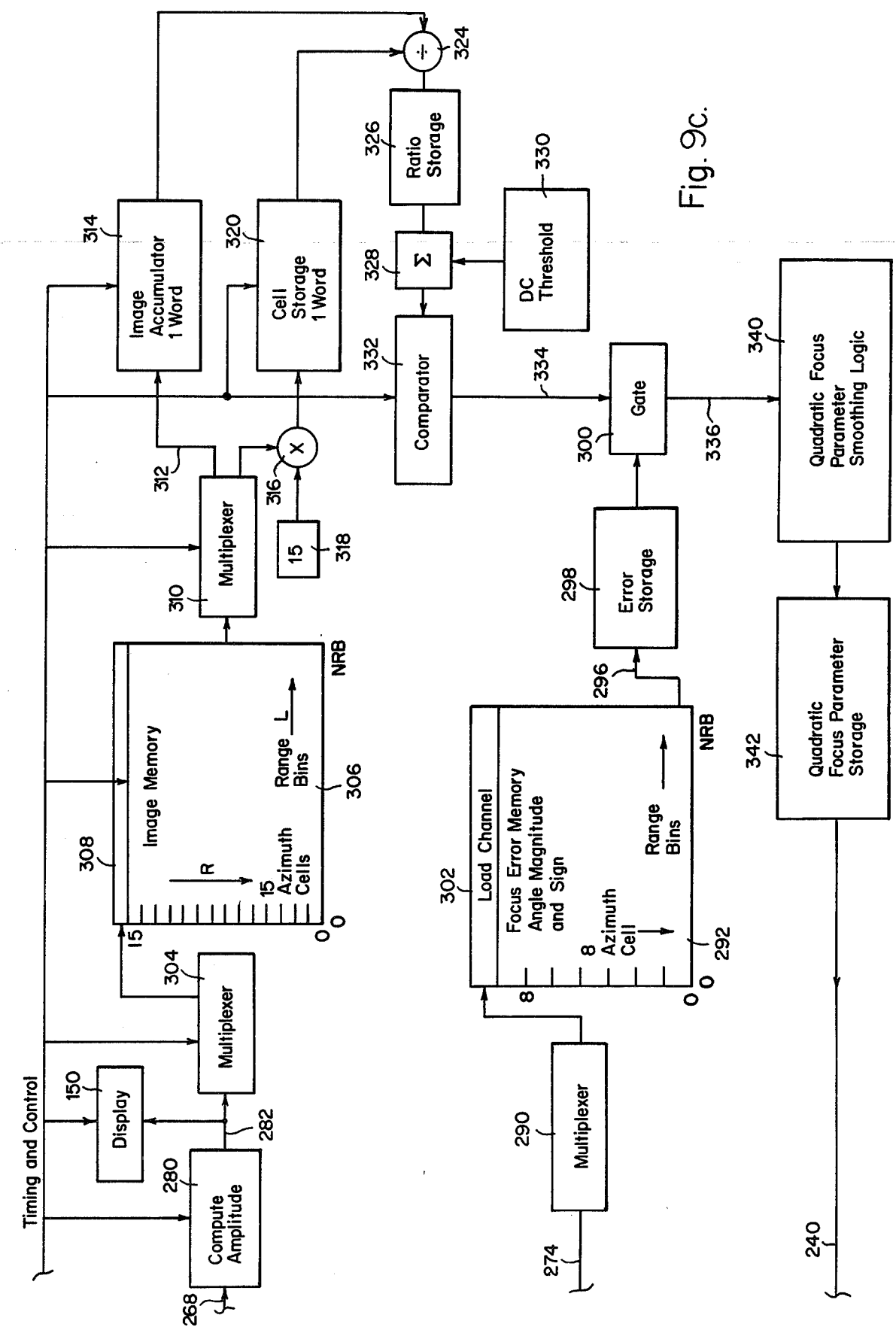

Referring now principally to FIG. 9c, the focus error signals derived in unit 272 and as supplied through composite lead 274 are applied through a multiplexer 290 to a focus error storage memory 292 in which is stored both the focus error magnitude and the error sign, and has a storage capacity for the respective error data derived on all 200 range bins for 8 contiguous azimuth resolution cells. It is to be noted that the 8th channel in focus error memory 292 provides the oldest stored focus error data so that it is available for readout on a composite lead 296. This stored delay of focus error data for 8 lines of imagery in unit 292 is provided so that it is available after the point target selection process is performed on the basis of contiguous imagery data. The delayed data from unit 292 is supplied on composite lead 296 to the focus error storage 298 for application to gate 300, where it is gated through for smoothing, when a data validity determination has been made on the basis of point target signal amplitude as compared to the average over adjacent azimuth resolution cells. The error storage memory 292 includes a load channel 302 so that as the focus error values are stored for each range cell over 8 contiguous azimuth cells, the data is recirculated to present it with delay to the error storage unit 298. After completing the array correlations for a complete line of imagery across the swath and loading into load channel 302, it is shifted downward into the first azimuth channel and the data in the eighth azimuth channel is shifted out or written over.

For determining whether or not the focus array data has been derived on a complex or point target within a given resolution cell, and for screening out invalid focus error data on complex scatterers, the imagery amplitude data on the composite lead 282 is applied through a multiplexer 304 and stored in an image memory 306 having 15 azimuth channels each including 200 range bins and with provisions for recirculation. New data is stored in the load channel 308 of the memory 306 and the storage format and data shifting sequence is similar to that described relative to the focus error memory 292. Examining dynamic operation after 15 lines of imagery have been stored in imagery memory 306, 15 samples of imagery for the first range resolution cell are available at the output of imagery memory 306 for rapid sequential readout by multiplexer 310. This multiplexed data is then applied through composite lead 312 to imagery accumulator 314 having a capacity of one word and in which the amplitude sum of 15 contiguous azimuth cells is accumulated. During the sequential multiplex through the 15 adjacent azimuth resolution cell amplitudes out of imagery memory 306, the 8th azimuth cell amplitude is multiplexed into multiplier 316 where it is multiplied by a constant value of 15 supplied by source 318. The output of multiplier 316 is stored in a one word cell storage unit 320. The ratio of this output is compared by division with the integrated output of accummulator 314 which has summed the amplitude of 15 contiguous azimuth resolution cells. This comparison is performed in divider 324 and the rate is stored in a one-word storage unit 326. The DC threshold from source 330 of FIG. 9c in the illustrated system is subtracted in a summer 328 from the stored ratio provided from storage unit 326. The resulting output of 328 is applied to a comparator 332 which provides a gate control output when its input from summer 328 is positive. The presence of a gate pulse on line 334 enables gate 300, allowing the delayed focus error data for that particular range element to be applied through a composite lead 336 to a quadratic focus parameter smoothing unit 340.

Ideally focus error data to be utilized for smoothing should be derived only from point target scatterers since complex scatterers lying within a resolution cell tend to contaminate the focus error measurement. The point scatterer selection criteria implemented here in the illustrated system is based on the logic that a complex scatterer having more than one scattering element in a resolution cell will also generally occupy more than one azimuth resolution cell. By averaging the imagery amplitudes over a plurality of contiguous azimuth resolution cells or other combination of adjacent resolution cells, a complex scatterer that occupies more than one cell will significantly affect this local overall average. By requiring the central resolution cell amplitude to exceed the local average of adjacent cell amplitudes by a selected amount, and then only using focus data derived on cells which meet this selection criteria, complex scatterers are discriminated against. It is to be understood that the scope of the invention is not limited to this particular focus error data validity test as illustrated, but also includes any suitable criteria that allows selection of focus error data primarily on point scatterers. The illustrated focus error data validity selection criteria has been found to operate satisfactorily in a closed loop system on actual flight recordings of coherent radar returns. This focus error data validity criteria also essentially eliminates focus error data derived on noise components.

Figure 10:
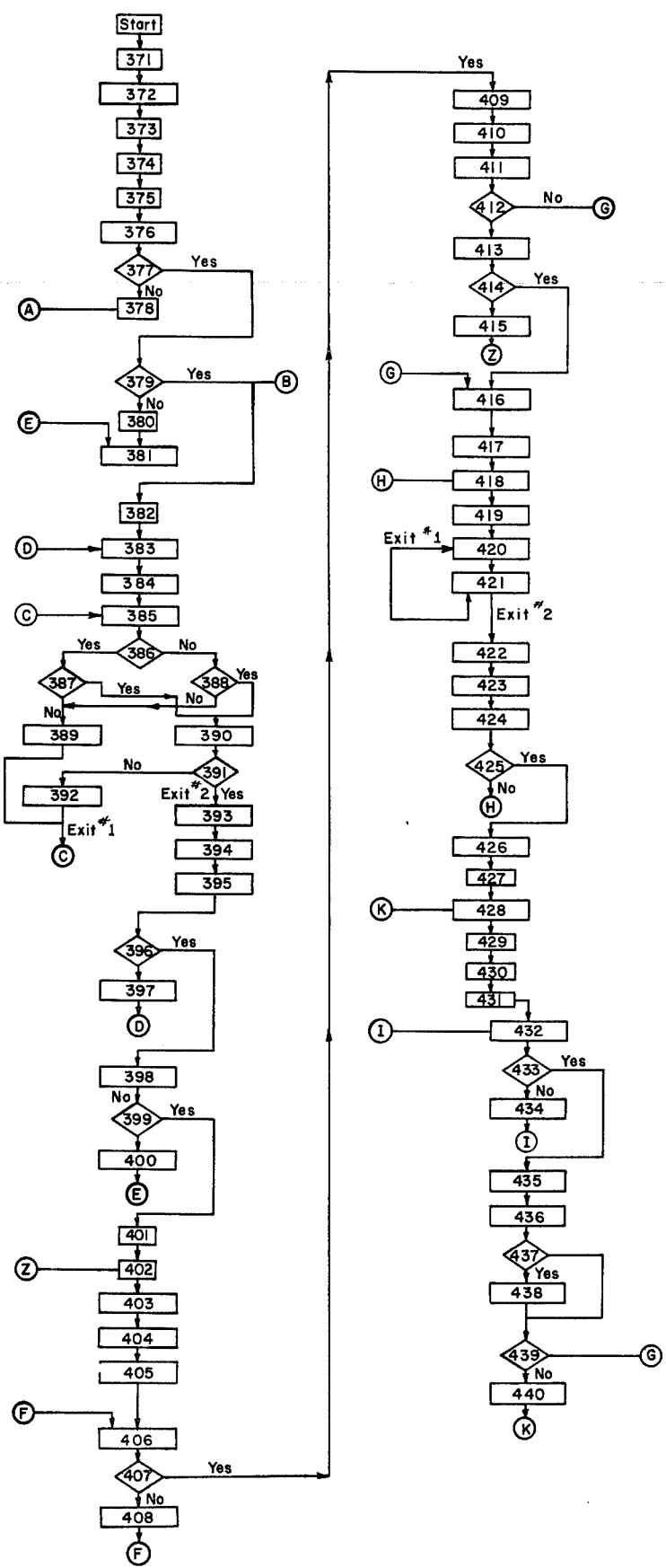
FIG. 10 is a computer flow diagram of the autofocus system in accordance with the diagram for explaining the sequence of operations as listed in the description and as further showing the various figures.

Referring now to FIG. 10, a flow diagram is shown of the processing to perform the out of focus error correction in accordance with the present invention. The flow diagram will be explained before going into further detail schematics relating to the out of focus mechanization. The essence of the processing is a computation of an error function which indicates by its sign whether synthetic array is over or under focused and by its magnitude the extent of the defocus. The error function is obtained by dividing the synthetic array into three contiguous sub-arrays 1, 2 and 3 and deriving the phase angle between 2 and the angle bisector of 1 and 3. Because of the phase interference between nearby point scatterers, that is scatterers separated by a few resolution cells, the error function cannot be used with confidence in all cells. A selection criterion is needed to decide if a particular cell is to be used for computing the error function. The selection criteria in accordance with the illustrated program is obtained by computing the average amplitude of 15 contiguous azimuth cells all in the same range bin, but it is to be understood that other varied configurations in both range and azimuth may be utilized. If the amplitude of the center cell of this 15 cell group exceeds the average by a factor of selected thresholds such as the square root of 10 then the center cell is used for computing the error function.

FIG. 10 shows the processing blocks 370 to 440 for performing the operation of the invention, the function being as follows for each block;

| BOX | OPERATION |
| --- | --- |
| 370 | Start. |
| 371 | 1. Generate and Store Amplitude weighting array. |
| 372 | 2. Generate and store azimuth reference function array using initial values of range, velocity and squint angle. |
| 373 | Let Q' = 1. |
| 374 | Let I' = 0. |
| 375 | Let J = 1. |
| 376 | 3. Store most recent range compressed presum |

-continued

| BOX | OPERATION |
|---|---|
| | group of range bin J into location (0, 1) of data memory and simultaneously move date in (0, L) to (0, L + 1) for L = 1, ..., (NRB − 1). (Data previously in (0, NRB) is dropped from data memory. (NRB - Nearest Range Bin) |
| 377 | Does J Equal NRB ? |
| 378 | Increment J by one. |
| 379 | Does K Equal 129? |
| 380 | Increment K by one. |
| 381 | 4. Move data in locations (K, L) of data memory to locations (K + 1, L) for K = 0, ... 127 and L = 1, ..., NRB. Data in (128, L) for L = 1, ..., NRB is dropped from memory. |
| 382 | J = 1 |
| 383 | M = 1<br>N = 1<br>P = 1 |
| 384 | Set Subarray Accumulators 1, 2 and 3 to zero. |
| 385 | 5. Read data in location (N, NRB) of data memory, complex multiply this with element N of focus array. Increment value in subarray accumulator M by this product. Simultaneously move data in location (N, L) to (N, L + 1) of data memory for l = 1, ..., (NRB − 1) and move data in (N, NRB) to (1, NRB). |
| 386 | Does M = 2? |
| 387 | Does P = 42? |
| 388 | Does P = 43? |
| 389 | Increment N by one<br>Increment P by one |
| 390 | Increment M by one |
| 391 | Does M = 4? |
| 392 | Let P = 1<br>Increment N by one |
| 393 | 7. Compute complex summation of a subarray accumulators 1, 2 and 3. Compute amplitude of resulting complex number. Store resulting amplitude into location (0, 1) of image memory while simultaneously moving data in (0, L) to (0, L + 1) of image memory for L = 1, ..., (NRB − 1). Data in (0, NRB) is dropped from image memory. |
| 394 | 8. Compute phase angle between subarray accumulators 2 and bisector of 1 and 3. Store this angle into location (0, 1) of error memory while simultaneously moving data in location (0, L) to (0, L + 1) of error memory for L = 1, ..., (NRB − 1). Data in location (0, NRB) is dropped from error memory. |
| 395 | Repeat Step 3 (box 376) resulting from most recent presum group of range bin J. |
| 396 | Does J = NRB? |
| 397 | Increment J by one. |
| 398 | 9. In image memory move data in location (K, L) to (K + 1, L) for K = 0, ..., 14 and L = 1, ..., NRB. Data in (15, L) for L = 1, ..., NRB is dropped from image memory. Simultaneously in error memory move data in location (K, L) to (K + 1, L) for K = 0, ..., 8 and L = 1, ..., NRB. Data in (8, L) for L = 1, ..., NRB is dropped from error memory. |
| 399 | Does Q' = 16? |
| 400 | Increment Q' by one. |
| 401 | Let J = 1. |
| 402 | Let Q' = 1. |
| 403 | Set image accumulator to zero. |
| 404 | 10. Take data in location (8, NRB) of error memory and store into error storage. |
| 405 | 11. Take data in location (8, NRB) of image memory, multiply by 15 and store product into cell storage. |
| 406 | 12. Take data in location (Q', NRB) of image memory and increment value in image accumulator by the value in location (Q', NRB). In image memory move data at (Q', NRB) to (Q', 1) and move data at (Q', L) to (Q', L + 1) for L = 1, ..., (NRB − 1). |
| 407 | Does Q' = 15? |
| 408 | Increment Q' by one. |

-continued

| BOX | OPERATION |
|---|---|
| 409 | Execute Step 7 resulting from most recently computed values in subarray accumulators 1, 2 and 3. |
| 410 | Repeat operation of Step 8 using the most recently computed values in subarray accumulators 1, 2 and 3. |
| 411 | 13. Take value in cell storage and divide by value in image accumulator. Store ratio in ratio storage. |
| 412 | 14. Is value in ratio storage greater than preselected threshold? |
| 413 | 15. Move value in error storage to quadratic focus parameter smoothing logic. Generate new value for quadratic focus parameter. This logic executes an exponential filter by the algorithm $a_{out}(N) = \mu a\ in\ (N) + \nu a_{out}(N − 1)$ where $a_{out}(N)$ is the Nth input, and $\mu$ and $\nu$ are constants, $\nu < 1$. Transfer this new value to azimuth focus reference array generator to generate new focus array. |
| 414 | Does J = 128? |
| 415 | Increment J by one. |
| 416 | Perform the operation of Step 4. |
| 417 | Let J = 1. |
| 418 | Let M = 1<br>N = 1<br>P = 1 |
| 419 | Set subarray accumulators 1, 2 and 3 to zero. |
| 420 | Perform Step 5. |
| 421 | Perform Step 6. |
| 422 | Perform Step 7. |
| 423 | Perform Step 8. |
| 424 | Execute Step 3 resulting from most recent presum group of range bin J. |
| 425 | Does J equal NRB? |
| 426 | Perform Step 9. |
| 427 | T = 1. |
| 428 | Set Image Accumulator to zero. |
| 429 | Perform Step 10. |
| 430 | Perform Step 11. |
| 431 | Let Q' = 1. |
| 432 | Perform Step 12. |
| 433 | Does Q' = 15? |
| 434 | Increment Q' by one. |
| 435 | Execute Steps 7 and 8 resulting from most recent values in subarray accumulators 1, 2 and 3. |
| 436 | Perform Step 13. |
| 437 | Perform Step 14. |
| 438 | Perform Step 15. |
| 439 | Does J equal NRB? |
| 440 | Increment J by one. |

The operation of each block of the flow diagram may be programmed in any suitable computer by one skilled in the art of programming well within the skill of the art. The operation starts in block 370 and block 371 generates and stores the amplitude weighting array. In block 372 the azimuth reference function array is generated and stored using initial values of range velocity and squint angle and in block 373, 374, and 375 Q is set=to 0 and J is set=to 1. Where Q is the azimuth count index I is the number of total azimuth presummed and J is the range cell number.

In step 1 of block 371 the amplitude weighting array has a from $A(K) = 1 - P \cos[(2\pi)(K-1)]/127$ $K = 1, ..., 128$. A quantity P is assigned the value of 0.64. Each element of this array can be computed by standard methods independent of the processor and stored into the amplitude weighting array storage before the processor is used. It is to be understood that the particular values of the parameters utilized to generate the array is not changed during the illustrated processing operation.

In step 2 of box 372 the azimuth reference focus function array is given by $B(K) = A(K) \exp[i\alpha(K-64.5)^2]$, $(K = 1, ..., 128)$. The parameter and the initial value of $\alpha$ is computed from the relation $\alpha = 2\pi D^2 \sin^2 \theta / \lambda R$ where $\theta$ = squint angle D = distance flow for presummed group, $\lambda$ = transmitted wavelength and R = range to target. The generation of the complex array B(K) is done in two steps, first computing $\alpha$. From this computer value of $\alpha$ the array A(K) and the array B(K) are generated. The value of $2\pi$ can be computed in advance and stored in a special memory location. Value for sine of $\theta$ and cosine of $\theta$ will be determined by means of a lookup memory which contain values of sine of $\theta$ and cosine $\theta$ in sufficiently small increments of $\theta$ so that a linear interpolation will yield the required accuracy. It is assumed that the values of $\theta$ B $\lambda$ and R have been received from the radar and stored in special memory locations. In step 3 of box 376, the most recent range compressed presummed group at range bin J is stored into location (01) of data memory and simultaneously data is moved in (O,L) to (O,L+1) for L=1, ..., (NRB−1). Data previously in (O, NRB) is dropped from the data memory. In box 377 the determination is made whether range bin J=NRB and if the answer is no, J is incremented in 1 in box 378 and the operation returns to box 376. When the range bin count J=NRB the operation proceeds to box 379 and a determination is made whether K the azimuth count=129 and if the determination is no, the operation proceeds to box 380 I is incremented by 1. If the determination from box 379 is yes, indicating that the memory is loaded with an array, the operation proceeds to box 382 where the range bin J is set=to 1. The operation proceeded to box 380. Then in step 4 of box 381 the data is moved and the nearest range bin data is dropped from memory. For a loaded memory, operation proceeds from box 382 to box 383 where M, N and P are set to 1, M representing the index 1, 2, 3 which is the accumulation number shown in FIG. 9b, being an index indicating whether load 1, 2 and 3 of the summations and N indicating the number of the element from the azimuth focus reference in box 236 of FIG. 9b and P representing the numbers of presum groups in each accumulation.

The operation then proceeds to block 384 in which subarray accumulators 1, 2 and 3 are set to 0. In step 5 of block 385 data is read in location N and NRB of data memory and complexly multiplied with element N of the focus array followed by properly moving the data in the memory.

The operation then proceeds to box 386 where the determination is made whether M=2 or the second accumulator and if the answer is yes the operation goes to box 387 to determine if P=42 or if that accumulator is full. If the answer is yes, the operation proceeds to box 390 where the sub-array accumulator index M is incremented by 1. From box 386 if the answer is no the determination is made whether P=43 and if the answer is yes the operation proceeds to box 390 and if the answer is no the operation proceeds to box 389.

From box 390 the operation proceeds to box 391 to determine if M=4 indicating the 3 accumulators are full and if the answer is no proceeds to box 392 where P is set to 1 for the next accumulator and N is incremented by 1.

From box 389, the flow diagram goes to the output of box 392 which is exit number 1 and from box 391 the operation goes to exit number 2 which enters back into box 385 of step 5.

From the M=4 exit of box 391, the operation proceeds to step 7 of box 393 where the computation is of complex summation of sub-array accumulators 1, 2 and 3 which have been filled. The amplitudes of the resulting complex number is computed and stored in an image memory while the old data is dropped from that memory.

The operation then proceeds to step 8 of block 394 where the computation of the focus error is. This error is that phase of the complex number in accumulation #2 minus the bisector of the sum of the phases of the complex numbers in accumulators #1 and #3. (See FIG. 17) This requires the evaluation of the phase of the complex number. For this evaluation a lookup memory may be utilized which contains the arc tangent function that is a phase in degrees of unit vectors versus their X and Y coordinates. It is assumed that these phases that is points around the the unit circle are spaced sufficiently close so that a linear interpolation will yield the desired accuracy. This memory contains points encompassing the entire circle that is phasors between −180 degrees and +180 degrees. Normalizing each vector to a unit vector requires the computation of the amplitude which in turn requires a square root function. The evaluation of the square root is performed by means of a square lookup memory with values spaced sufficiently close so that the required accuracy is obtained.

The operation then proceeds from box 394 to box 395 where the operations of step 3 are repeated using the most recent presummed group of range bin J. The operation then proceeds to box 396 where the determination is made whether J=RB and if the answer is no, proceeds to box 397 where J is incremented by 1, proceeding from that step to box 383 and repeating the previous operation.

If the determination in box 396 is yes, the operation proceeds to step 9, of box 398. The computation up to this point has computed the focus error and image amplitude for one line of range cells. In step 9, the image memory data is moved and the old data is dropped from the memory and the error memory data is moved and the old data is dropped from the error memory.

The operation then proceeds to box 399 where determination is made if Q'=16 and if the answer is no, proceeds to box 400 where Q' is incremented by 1 followed by returning to step 4 of box 381. If the determination in box 399 is yes, the operation proceeds to box 401 where J is set to 1 and in turn proceeds to box 402 where Q is set to 1. The operation then proceeds to box 403 where the image accumulator is set to 0. The computation then proceeds to box 404 which is step 10 and the data in location (8, NRB) of the error memory is stored into error storage.

The operation then proceeds to step 11 of box 405 in which the data in location (8, NRB) of the image memory is multiplied by 15 and the stored product is entered into cell storage. The next step is step 12 in box 406 the value in the image accumulator is incremented by the value in (Q', NRB) in the image memory. In the image memory the data at (Q', NRB) is moved to (Q', 1) and the data at (Q'L) is moved to (Q',L+1).

The next step of box 407 makes the determination if Q'=15. If the answer is no, proceed to box 408 where Q' is incremented by 1 and the operation proceeds to step 12 which is again repeated. If the answer from box 407 is yes, operation proceeds to box 409 and the operations of step 7 are repeated using most recently computed values in the sub-array accumulators 1, 2 and 3.

The next step 410, repeats the operations of step 8 using the most recently computed values in the sub-array accumulators 1, 2 and 3. Step 13 of box 411 takes the value in cell storage and divides by the value in the image accumulator, storing the ratio in the ratio storage unit for determination whether the error signal for a particular point target is one that is to be utilized for focusing.

The operation proceeds to box 412, step 14 and the determination is made as to whether the value in the ratio storage is greater than the preselected threshold which in the illustrated arrangement was the square root of 10. If the answer is no, the operation skips to box 416 which repeats the operations of step 4.

If the answer in box 412 is yes, the operation passes to box 413 in which moves the values in error storage through the quadratic focus parameter smoothing logic. A new smoothed focus parameter is generated and transferred to the quadratic focus parameter storage, and thence to the azimuth focus reference function array generator. The smoothing logic uses the exponential filter algorithm, $a_{out}(N) = \mu a_{in}(N) + \nu a_{out}(N-1)$ where $a_{out}(N)$ is the Nth output, $a_{in}(N)$ is the Nth input and $\mu$ and $\nu$ are constants, $\nu < 1$.

From step 15 the operation proceeds to box 414 where the determination is made whether $J = 128$ and if the answer is no proceeds to box 415 where J is incremented by 1 and the operation then returns to box 402 and sets $Q = 1$. If the determination from box 414 is yes, the operation proceeds to box 416 and passes to box 417 where J is set = 1. From box 417 the operation goes to box 418 where the indexes M, N and P are all set = 1 and then proceeds to box 419 where the sub-array accumulators 1, 2 and 3 are all set to 0.

Proceeding to box 420 repeats the operations of step 5 and in turn to box 421 that repeats the operations of step 6 with exit 1 going to box 420 and exit number 2 going to box 422. Box 422 repeats the operations of step 7, proceeds to box 423 where the operations of step 8 are repeated and to box 424 where the operations of step 3 are repeated using data from the most recent presummed group of range bin J. In the next operation box 425 makes the determination whether $J = NRB$. If the answer is no, the operation returns to box 418 to repeat the process. If the answer in box 425 is yes, the operation proceeds to box 426 where the operations of step 9 are repeated. The operation proceeds to box 427 where J is set = 1 and proceeds to box 428 where the image accumulator is set to 0. Next the operations of step 10 are performed in box 429 followed by the operations of step 11 in box 430 and the setting of Q to 1 in box 431.

In box 432 the operations of step 12 are performed. In box 433 the determination is made whether $Q = 15$. If the result is no, the operation proceeds to box 434 where Q is incremented by 1 and the operation returns to box 432. If the result in box 433 is yes, the operation proceeds to box 435 where the operations of steps 7 and 8 are executed using the most recent values in the sub-array accumulators 1, 2 and 3.

The next operation is in box 436 where the operations of step 13 are performed. The operation then proceeds to box 437 to perform the operations of step number 14. If the result of box 437 is no, the operation proceeds to box 416. If the result is yes, the operation proceeds to box 438 where the operations of step 15 are performed. The operation then proceeds to box 439 where the determination is made if $J = NRB$. If the answer is yes, operation returns to box 416. If the answer in box 439 is no, the operation proceeds to 440 where J is incremented by 1 and then proceeds to box 428. This procedure continues during the entire period of the continuous array processing and error signal formation.

Referring now to FIG. 11 which shows a diagram for the initial computation of the quadratic focus parameter $\alpha$ as described under step 2 above. A $\theta$ storage source 480 applies values to a box 482 which determines two values of $\theta$ in the sin $\theta$ lookup memory 484 which are closest to the value in the $\theta$ storage. Linear interpolation is then performed in box 486 to evaluate sin $\theta$ which is then applied to a multiplier 488 to generate $\sin^2 \theta$ which is in turn applied to a multiplier of 490 receiving data from a $2\pi$ storage 492 to generate the term $2\pi \sin^2 \theta$ which is then applied to a multiplier 496. A D storage unit 498 applies a D term to a multiplier 500 which then applies $D^2$ to the multiplier 496 which generates a term $2\pi D^2 \sin^2 \theta$ which is applied to a divider 504.

The term $\lambda R$ is derived from an R storage unit 506 and a $\lambda$ storage unit 508 which apply the terms to a multiplier 510. The ratio $2\pi D^2 \sin^2 \theta / \lambda R$ is derived from divider 504 and applied to the quadratic focus parameter storage unit 342.

Figure 12:
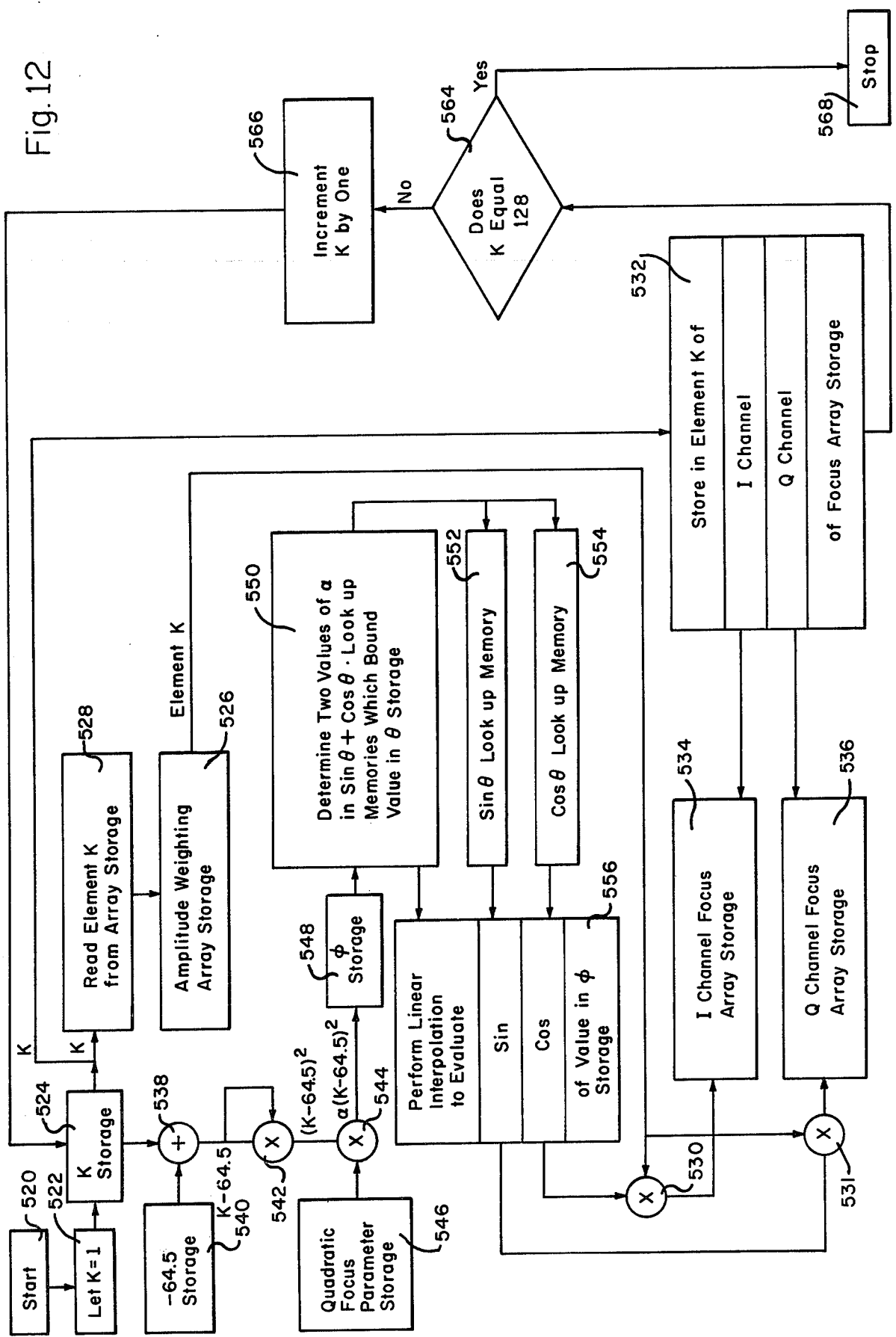
FIG. 12 is a schematic and flow diagram for explaining the generation of the azimuth focus reference function array.

The azimuth focus reference function array in storage 236 of FIG. 9b will be explained in FIG. 12. The azimuth focus reference function array is utilized to correct the phase of the signal vectors along the array length may be expressed as $A(K) \exp[i\Phi]$ where $\Phi$ is $\alpha (K - 64.5)^2$, K is a parameter that varies between 1 and 128 representative of the number of presum groups and $\alpha$ was derived in FIG. 11.

In response to a start block 520 K is set to 1 in the block 522 and stored in block 524. The stored K is applied to box 526 which reads K from an amplitude weighting array storage block 528 and applies it to a multiplier 530. The element K is also applied to a block 532 which controls storage of the value K in an in phase (I) channel focus array storage 534 and a quadrature (Q) channel focus array storage 536. A summer 538 receives the K value from the block 524 and a value of $-64.5$ from a block 540 and after passing through a multiplier 542 develops the expression $(K - 64.5)^2$ which is multiplied in a multiplier 544 with received from the quadratic focus parameter storage 546 to generate the value $\Phi$ which is applied to a block 548 for storing age. In a block 550 two values of $\theta$ are determined in sin $\theta$ and cos $\theta$ which bound the value of the $\Phi$ storage and applied to a sin $\theta$ lookup memory 552 and a cos $\theta$ lookup memory 554. In a block 556 linear interpolation is performed to generate sin $\Phi$ and cos $\Phi$ which are respectively applied to the multipliers 530 and 531 to generate the azimuth reference focus array which is stored in the I channel focus array storage 534 and the Q channel focus array storage 536. The value of K stored in the block 532 is applied to a block 564 to determine if the array is completed. If K did not equal 128, it is incremented by 1 in a block 566 and applied to the K storage block 524. When $K = 128$ the operation proceeds to the stop block 568 thus the focus reference function array storage unit 236 of FIG. 9b is completed for each sequential main cell.

Referring now to FIG. 13, step 5 of the program involving the data memory 214 and the multiplier 226 of FIG. 9b will be further explained. The I and Q data is read from the data memory 214 through a block 580 and the azimuth focus reference function I and Q values are read from the storage 236 through a block 582 and I terms are multiplied in multipliers 584 and 586. The Q1 and Q2 terms are multiplied in multipliers 588 and 590.

The product of I1 and I2 and the product of Q1 and Q2 are applied to a subtractor 594 to generate the I term and the product I1 and Q2 and the product of Q1 and I2 are applied to a summer 596 to generate the Q term. As previously discussed, the memories 214 and 236 are rearranged after each range cell is read out.

Figure 14:
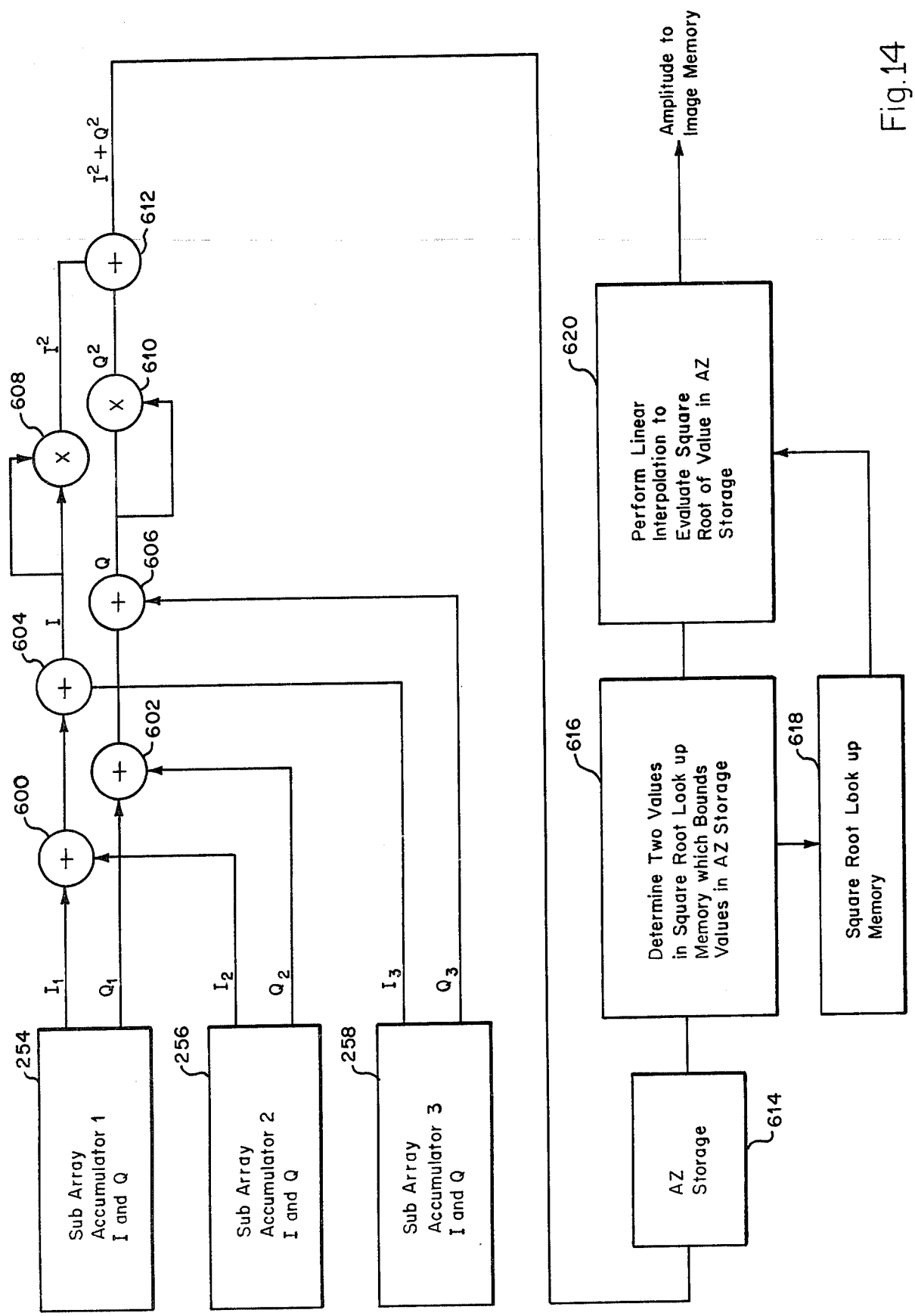
FIG. 14 is a schematic and flow diagram for further explaining step 7 of FIG. 10.

Referring now to FIG. 14, step 7 of the program will be further explained. The data from the three sub-array accumulators is vector summed; the resultant magnitude is determined and stored in the image memory 306. The accumulators 254, 256 and 258 respectively designated as accumulators 1, 2 and 3 respectively generate sub-array resultant signals $I_1Q_1$, signals $I_2Q_2$ and signals $I_3Q_3$. A summer 600 receives $I_1$ and $I_2$, a summer 602 receives $Q_1$ and $Q_2$, a summer 604 receives $I_3$ and the sum from summer 600 and a summer 606 receives $Q_3$ and the sum from summer 602. The outputs from summers 604 and 606 respectively designated as I and Q are applied through multipliers 608 and 610 to generate respective signals $I^2$ and $Q^2$ which are applied to a summer 612 to generate the term $I^2+Q^2$ which is applied to an AZ storage unit 614. In a block 616 two values are determined in a square root lookup memory 618 which bounds the value in the AZ storage 614 and linear interpolation is performed in a block 620 to evaluate the square root of the value in the AZ storage with the amplitude as determined applied to the image memory 306.

Figure 15:
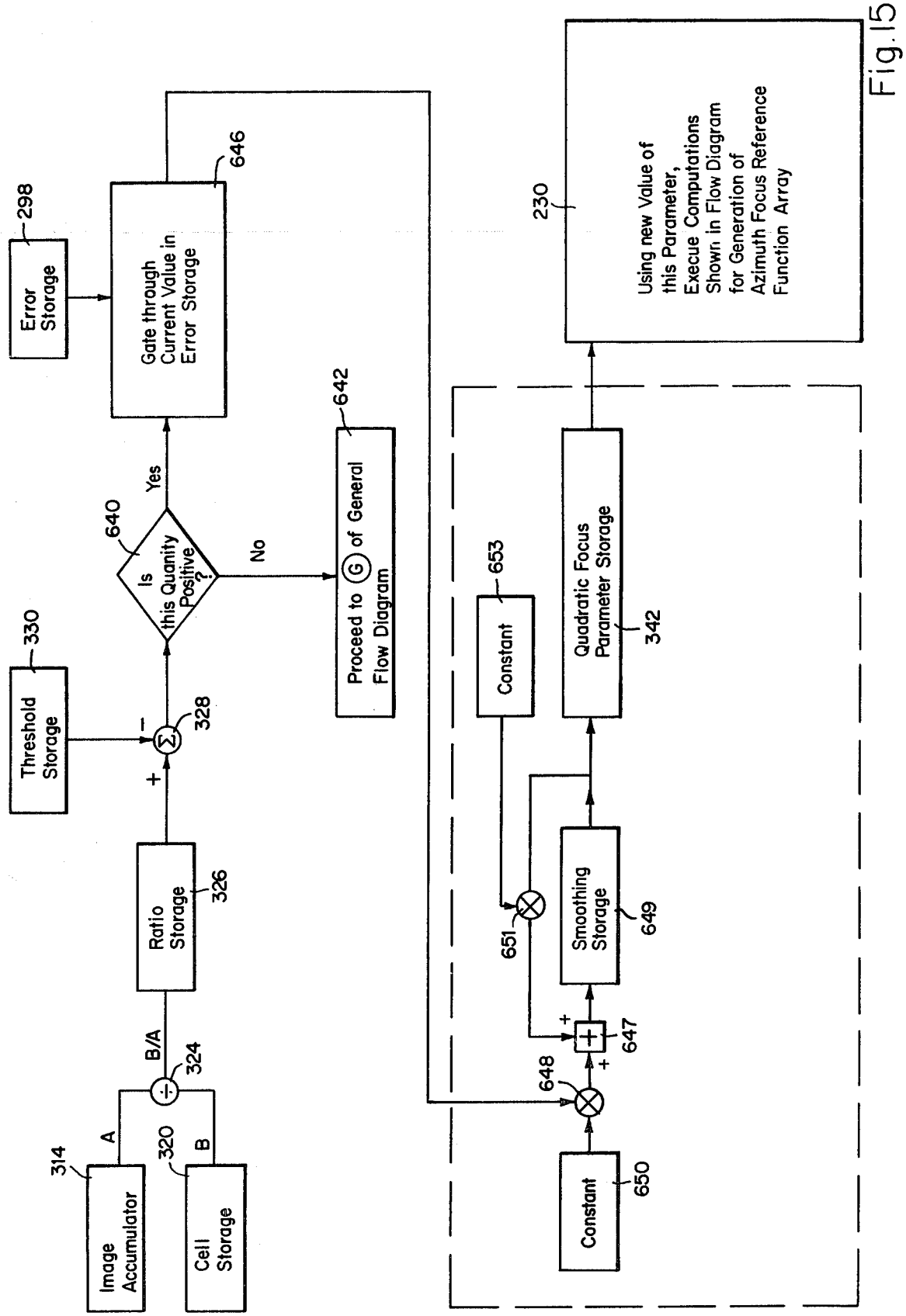
FIG. 15 is a schematic and flow diagram for further explaining steps 13, 14 and 15 of FIG. 10.

Referring now to FIG. 15, the steps 13, 14 and 15 of the flow diagram which determine the validity of the focus error angle will be explained in further detail. The values in the image accumulator 314 and the cell storage unit 320 are applied to the divider 324 to generate the ratio B/A which is stored in the unit 326 and then applied to the summer 328 where a threshold constant such as $\sqrt{10}$ is subtracted therefrom. The remainder is then applied from the summer 328 to a block 640 to determine if the value is positive. If it is not, the operation proceeds to a block 642 which is the entry into step 4 of the flow diagram. If the quantity is positive in the block 640 indicating the validity of the focus error signal, it is then stored, gated through a block 646 to a multiplier 648 receiving a stored constant value from a storage block 650 so that only a small fraction of the error signal is applied to a summer 647 to be added to the accummulated data in the smoothing storage unit 649. Smoothing storage unit 649, thru feedback integration contains the smoothed focus error data for each range cell across the range swath. The feedback time constant is determined in a multiplier 651 receiving a feedback constant from a source 653; this feedback time constant being maintained at unity or slightly less, depending on the desired smoothing time. The smooth error signal for each range bin is then used as a cross-line-of sight velocity correction term in the generation of the azimuth focus reference function in unit 230.

Figure 16A:
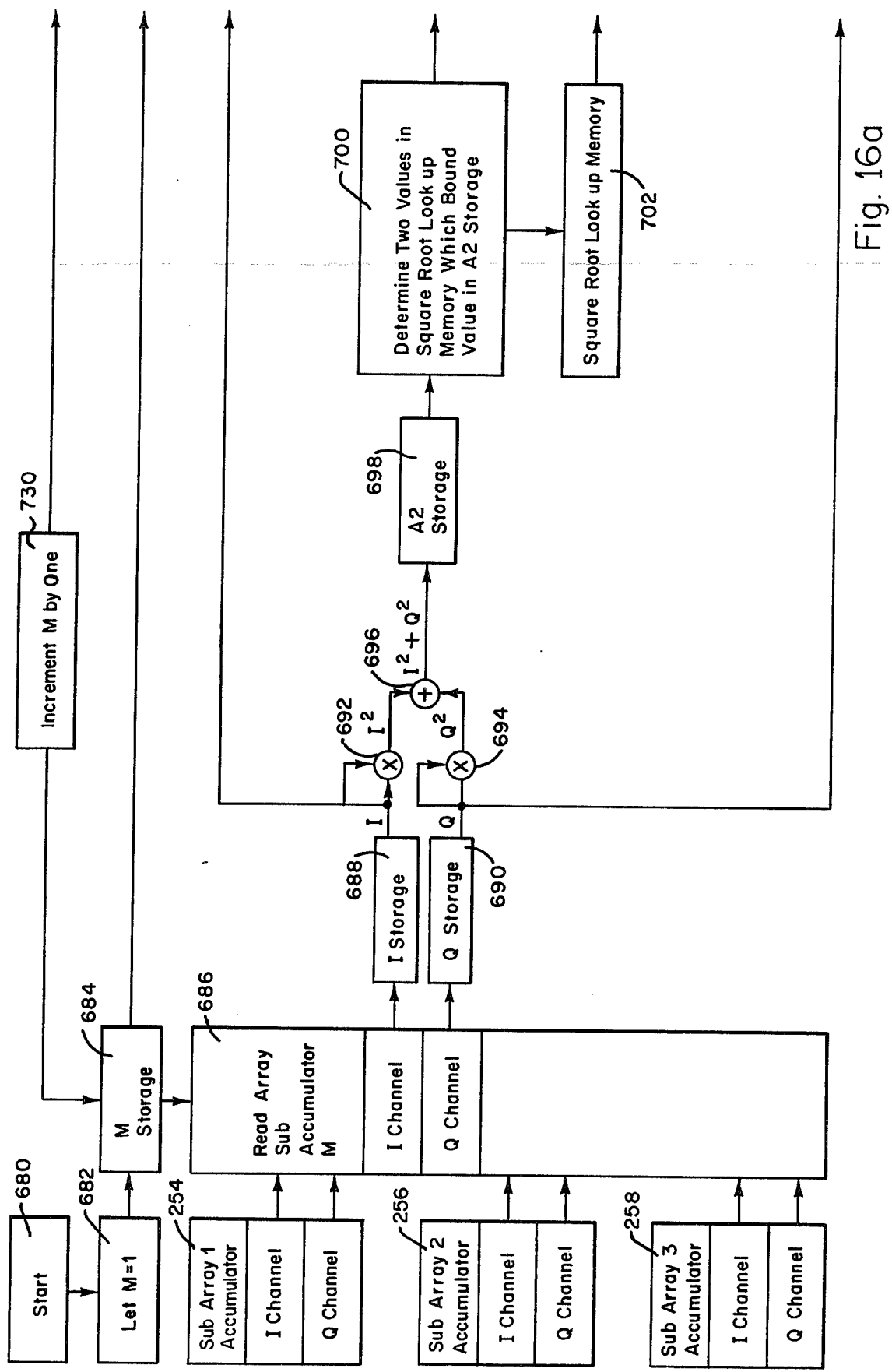
FIGS. 16a, 16b and 16c are schematic and flow diagrams for further explaining the determination of the focus error function.
Figure 16B:
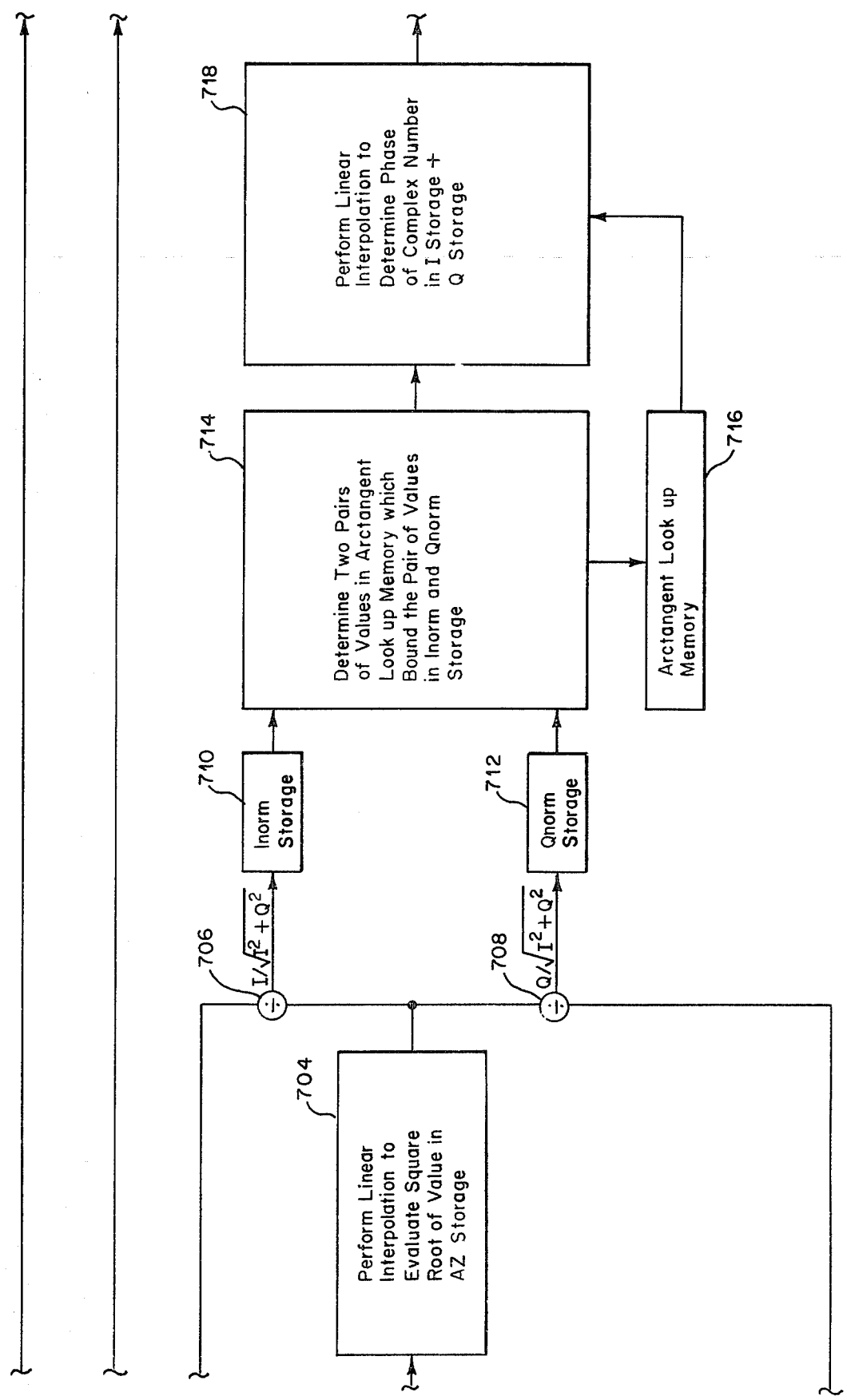
Figure 16C:
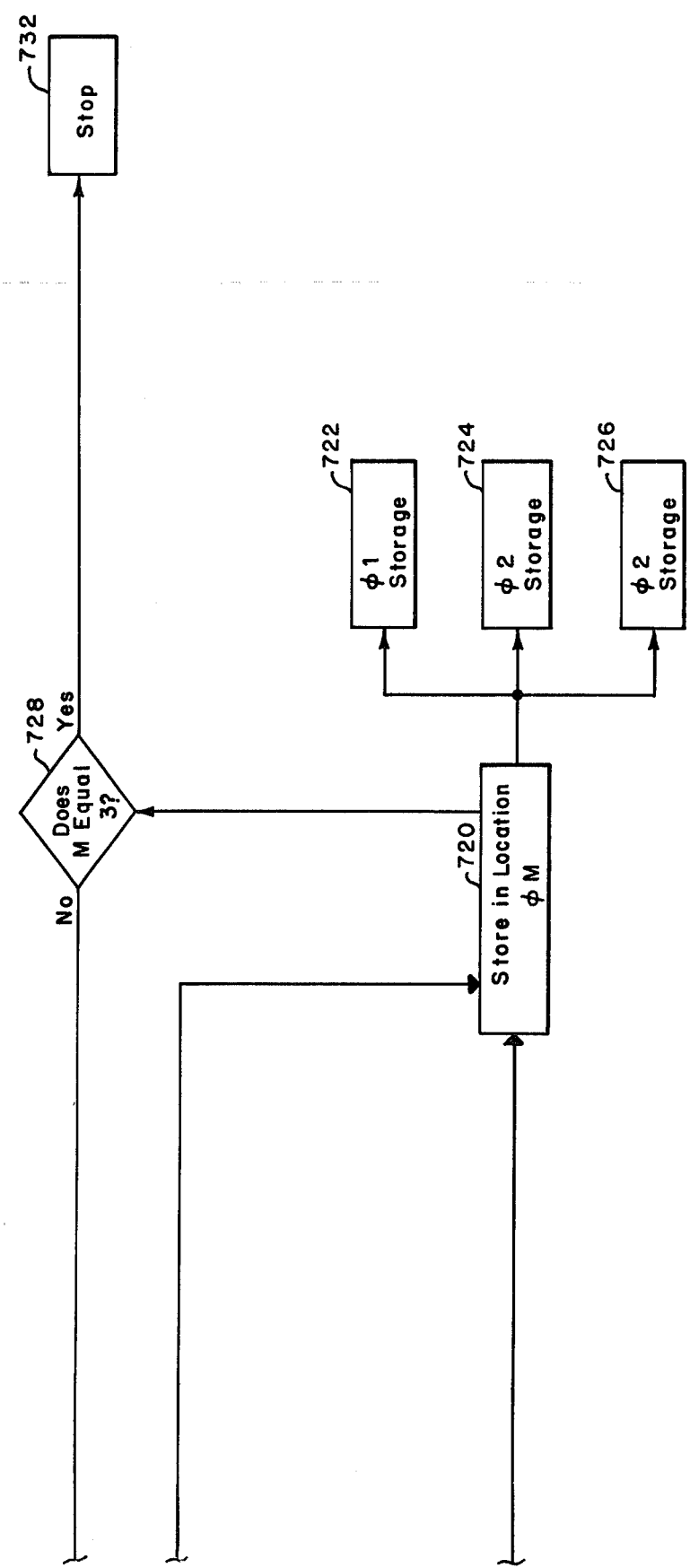

Referring now to FIGS. 16a, 16b and 16c, the determination of the error function will be further explained. From a start block 680 image set equal to 1 in a block 682 and stored in a block 684, M being an index representing the sub-arrays 1, 2 and 3. In response to the M value in the block 684, a block 686 reads "See selected accumulator 254, 256 and 258" and passes the corresponding I and Q values to I storage block 688 and Q storage block 690. Multiplier 692 and 694 and a summer 696 then generate the term $I^2+Q^2$ which is applied to an AZ storage block 698 and therefrom to a block 700, then, utilizing a lookup memory 702, two values which bound the value in the AZ storage unit are determined. Linear interpolation is then formed in a block 704 to evaluate the square root of the value in the AZ storage block 698 and applied to dividers 706 and 708 which respectively generate the terms $I/\sqrt{I^2+Q^2}$ and $Q/\sqrt{I^2+Q^2}$ which are respectively stored in an I (normalized) storage unit 710 and a Q (normalized) storage unit 712. In a block 714, two pairs of values are determined in an arc tangent lookup memory 716 which bound the pair of values in I (normalized) and Q (normalized) and linear interpolation is performed in block 718 of the complex number in the I storage and in the Q storage unit 710 and 712. The phase angle of the complex number developed in the block 718 is then applied through a block 720 wherefrom a function of M is stored in a $\Phi 1$ storage unit 722, a $\Phi 2$ storage unit 724 or a $\Phi 3$ storage unit 726. The value of M stored in block 684 is applied to a block 728 which determines if M=3 and if the determination is no, it is incremented by 1 in a block 730 and stored in a block 684. In M=3, the operation proceeds to a stop block 732.

Figure 17:
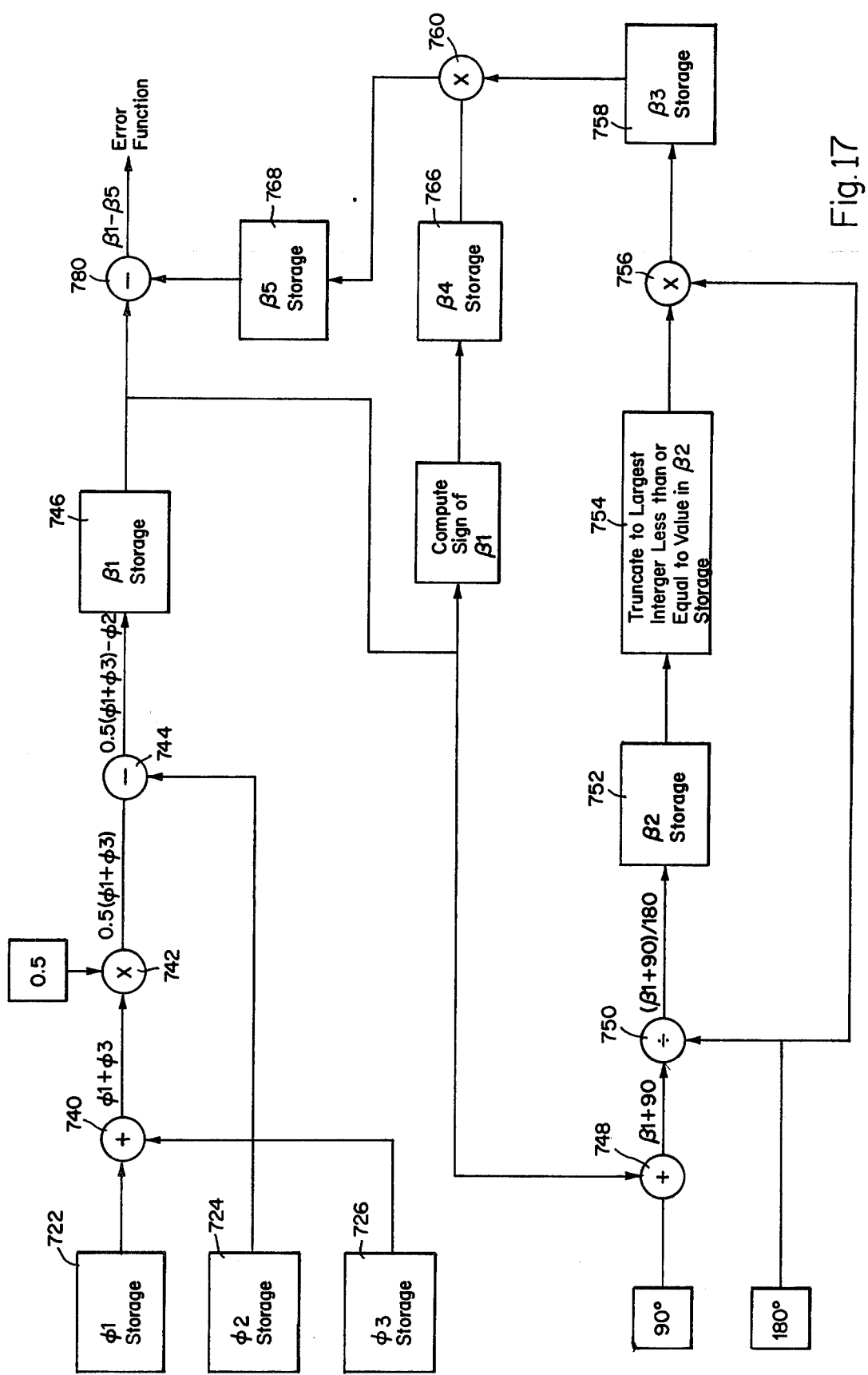
FIG. 17 is a schematic and flow diagram for further explaining the determination of the error function.

Referring now to FIG. 17, the determination of the error function by bisecting the resultant vectors of the outer sub-arrays and then comparing the bisector with a resultant of the central sub-array will be further explained. The $\Phi$ values stored in unit 722 and 726 are applied to a summer 740 and generate $\Phi 1+\Phi 3$ which is then bisected in a multiplier 742 receiving a value 0.5 and then applied to a subtractor 744 also receiving the value $\Phi 2$ from the storage unit 724. The term 0.5 $(\Phi 1+\Phi 3)-\Phi 2$ is then applied to $\beta 1$ storage block 746 and in turn to a summer 748 to be summed with 90 degrees and applied to a divider 750 or it is divided by a value of 180 degrees. The term $(\beta 1+90)/180$ is then applied to a $\beta 2$ storage unit 752 and then truncated in a box 754 and applied to a multiplier 756 to be multiplied by a value of 180. The product from the multiplier 756 is applied to a $\beta 3$ storage unit 758 and then is applied to a multiplier 760. The value in a $\beta 1$ storage unit 746 is applied through a block 764 which computes the sine of $\beta 1$ and applies the sine to a $\beta 4$ storage block 766 to be multiplied in the multiplier 760. The $\beta 5$ value from the multiplier 760 is applied to the $\beta 5$ storage unit 768 where it is utilized in a subtractor 780 also receiving the $\beta 1$ stored value to generate a term $\beta 1-\beta 5$ which is an error function term that varies between $\pm 90$ degrees.

Although in the illustrated system the average value for the presum groups in azimuth was taken along 15 azimuth presum groups, reference is now made to FIG. 18 to illustrate that any suitable local imagery area may be utilized to obtain an average amplitude. For example an area group of five cells in azimuth and five cells in range may be utilized as the averaging area for comparing against the magnitude in the central cell 790. To determine the average for a point target or resolution cell 794, the average is taken over the area 796. It is to be understood that the principles of the invention are not limited to pick an average over any specific configuration but that includes all areas that may provide a suitable local area average of imagery amplitude against which to compare the instantaneous amplitude of a central cell.

It is to be understood that the derived and smoothed focus error data can be used, as illustrated, in closed loop fashion to correct for example, for errors in the cross-line-of-sight velocity data, or instead the derived and smoothed focus error data can be used in open loop fashion as an indication of defocus.

It is to be further recognized that the principles of the invention are equally applicable to synthetic systems performing continuous or batch processing.

Thus there has been described a system for automatically focusing a synthetic array, for deriving focus error signals which may be used in a closed loop autofocus system. The focus error signals are derived by breaking the total synthetic array into sub-arrays such as three sub-arrays, and the sub-array resultant vector signals resulting from each sub-array are phase compared to derive a signal representative of the degree of defocus. In one arrangement, the phase angle of one end sub-array resultant is in effect measured relative to that of the other sub-array resultant, and the phase angle bisector thereof determined. The angle that this bisector makes with respect to the phase angle of the central sub-array resultant is a measure of the degree of defocus and the sign of this angle is indicative of whether the synthetic array is overfocused or underfocused.

Because multiple scatterers within a single resolution cell contaminate the focus error data, a running average of the amplitude of adjacent image resolution cells in azimuth or in any suitable selected local area is determined, followed by the requirement that the central cell amplitude exceed the average of the surrounding cells by a selected threshold. Only when this test is successfully met is the error focus signal for any particular point target utilized to correct the focusing of the system. It is to be understood that the mechanization for determining the sub-array resultant phase angle bisector and then comparing that phase with the resultant vector of the central sub-array is not limited to the illustrated arrangement or to any particular arrangement but may be performed by any suitable mechanization.

What is claimed is:

1. An autofocus system for a synthetic array system having data representing a plurality of point targets over a selected area comprising:
    means for storing first, second and third contiguous sub-arrays of point target data,
    means for generating resultant vectors for each of said sub-arrays,
    means for combining the resultant vectors of the first and third sub-arrays to derive a mean phase,
    means for comparing the derived mean phase with the phase of the resultant of the second sub-array to provide a focus error signal, and
    means coupled to the means for comparing, for determining the validity of said focus error correction signal.

2. The combination of claim 1 in which the means for determining the validity comprises:
    means for averaging the imagery amplitudes of point targets around a point target being processed,
    means for comparing the amplitude of the target being processed with the averaged value to determine the relative amplitude relations,
    and means responsive to said means for comparing to select valid focus correction signals.

3. The combination of claim 1 in which said means for comparing includes means for determining both the magnitude and sign of the focus correction signal with the magnitude thereof representative of the degree of defocus and the sign thereof representative of whether the array is underfocused or over-focused.

4. The combination of claim 3 in which said synthetic array system includes a quadratic reference function means, and means coupling the means for determining to said quadratic reference function means for providing a closed loop correction to said quadratic reference function.

5. The combination of claim 4 in which a smoothing means is included in the means coupling the means for correcting the said reference function means.

6. A system for generating a focus error system from point target data over an array being processed comprising:
    means for deriving the focus error data in three adjacent sub-arrays over said array,
    means for forming a resultant vector for each sub-array,
    means for determining a vector substantially bisecting the resultant vectors of the sum of the angle of the two outer sub-arrays,
    means for comparing the phase of the bisected vector with the resultant vector of the center sub-array to develop a focus error signal having amplitude and phase,
    means responsive to said means for determining, for selecting focus error signals as valid signals.

7. The system of claim 6 in which said means for selecting focus error signals includes means for averaging a selected area around point target data from which a focus error signal is developed and means for comparing the amplitude of the said point target with the average amplitude to determine a valid focus error signal.

8. The combination of claim 7 including gating means coupled to said means for comparing and to the means for selecting for passing a focus error signal therethrough when determined a valid signal.

9. The system of claim 8 in which the system includes a phase shifting means for correcting the phase of the point target data along the array length and further comprising:
    quadratic reference function generating means coupled to said phase shifting means for generating a quadratic reference function and controlling said phase shifting means, and
    means coupling said gating means to said quadratic reference function generating means for providing a correction of said quadratic reference function.

10. The combination of claim 9 in which said means coupling said gating means includes smoothing means.

11. The combination of claim 6 further including means coupled to said means for comparing and to said means for selecting for providing valid focus error signals, and
    smoothing means coupled to said means for providing for smoothing said focus error signal with a selected time constant.

12. A system operating with a synthetic array system having data representing a plurality of contiguous point targets over a selected area comprising:
    first means for storing first, second and third contiguous sub-arrays of point target data,
    second means coupled to said first means for developing the resultant vectors of said first, second and third sub-arrays for each point target,
    third means coupled to said second means for determining for each point target a vector substantially bisecting the sum of the angles of the resultant vectors of the first and third sub-arrays, and
    fourth means coupled to said second and third means for developing for each point target a focus error signal representative of the phase angle between the bisecting vector and the resultant vector of said second sub-array.

13. A focused synthetic array processing system in which a data source provides data for a plurality of contiguous point targets representative of data received over a selected area along a flight path comprising:
   phase shifting means coupled to said source,
   sub-array accumulating means coupled to said phase, accumulating means coupled to said phase shifting means for storing accumulating sub-array resultant vectors for point targets for said first, second and third sub-arrays,
   first means coupled to said sub-array accumulating means for determining for a point target the phase bisector of the resultant vectors of said first and third sub-arrays,
   second means coupled to said sub-array accumulating means and to said first means for comparing the phase angle of said bisector with the phase angle of the sub-array resultant vectors of said second sub-array to develop focus error signals,
   third means for storing said focus error signals,
   storage means coupled to said sub-array accumulating means for storing amplitude data of said point targets of a selected number near point targets being processed,
   fourth means coupled to said storage means for developing a signal indicating valid focus error signals,
   fifth means coupled to said third means and to said fourth means for passing valid focus error signals, and
   quadratic focus generator means coupled between said fifth means and said phase shifting means for applying said valid error signals to said quadratic focus generator means to provide a substantially correct phase correction to said phase shifting means along the array length.

14. The system of claim 13 further including smoothing means coupled between said fifth means and said quadratic focus generator means for providing a smoothed focus error signal to said quadratic focus generator means.

15. The system of claim 14 in which said fourth means includes means for developing an average of the amplitude of point targets in a local area adjacent to each point target being processed, and
   means responsive to said average to develop a validity signal when the amplitude of a point target exceeds said average by a predetermined amount.

16. In a processing system for synthetic array data representing a plurality of point targets, a method of forming focus error signal comprising the following steps:
   generating resultant vectors for each of first, second and third contiguous sub-arrays,
   determining the phase of a bisector of the sum of the angles of the resultant vectors for said first and third sub-arrays,
   comparing the phase of the bisector with the phase of the resultant vector of said second sub-array to develop a focus error signal, and
   determining the validity of said focus error signal.

* * * * *